(12) United States Patent
Benner et al.

(10) Patent No.: US 6,710,743 B2
(45) Date of Patent: Mar. 23, 2004

(54) SYSTEM AND METHOD FOR CENTRAL ASSOCIATION AND TRACKING IN PASSIVE COHERENT LOCATION APPLICATIONS

(75) Inventors: Robert H. Benner, Gaithersburg, MA (US); Gregory Baker, Colorado Springs, CO (US); Jon Rucker, Centreville, VA (US)

(73) Assignee: Lockheed Martin Corporation, Gaithersburg, MD (US)

( * ) Notice: Subject to any disclaimer, the term of this patent is extended or adjusted under 35 U.S.C. 154(b) by 0 days.

(21) Appl. No.: 10/136,441

(22) Filed: May 2, 2002

(65) Prior Publication Data

US 2003/0085840 A1 May 8, 2003

Related U.S. Application Data

(60) Provisional application No. 60/288,492, filed on May 4, 2001.

(51) Int. Cl.[7] .................................................. G01S 3/02
(52) U.S. Cl. ...................................................... 342/453
(58) Field of Search ................................. 342/450, 451, 342/453

(56) References Cited

U.S. PATENT DOCUMENTS

| | | | |
|---|---|---|---|
| 3,242,487 A | 3/1966 | Hammack | 343/7 |
| 3,270,340 A | 8/1966 | Hammack | 343/7 |
| 3,286,263 A | 11/1966 | Hammack | 343/112 |
| 3,573,611 A | 4/1971 | Bergemann et al. | 324/57 |
| 3,706,096 A | 12/1972 | Hammack | 343/9 |

(List continued on next page.)

FOREIGN PATENT DOCUMENTS

| | | |
|---|---|---|
| DE | 38 18 813 C | 6/1999 |
| FR | 2 776 438 A | 9/1999 |
| WO | 01/84181 A2 | 11/2001 |

OTHER PUBLICATIONS

Roger W. Schwenke; Sensitivity Analysis Of An Estimator–Correlator For The Detection Of Spread Targets With Multiple Discrete Highlights; The Pennsylvania State University Graduate School; Dec. 2000; p. 1–13.

J. M. Holt, P. J. Erickson, A. M. Gorezyca, T. Grydeland; MIDAS–W: a workstation–based incoherent scatter radar data acquisition system; Annales Geophysics; Jun. 21, 2000; p. 1231–1241.

David R. Martinez; Application of Parrallel Processors to Real–Time Sensor Array Processing; MIT Lincoln Laboratory; Jun. 3, 1999; p. 1–7.*

Wu Jianqi, He Ruilong and Jiang Kai; Researches of A New Kind of Advanced Metric Wave Radar; I.E.E.E.; Jun. 1999;p. 194–197.*

P.E.Howland; "Target–tracking using television–based bistatic radar";IEE Proc.–Radar, Sonar Navig., vol. 146, No. 3, Jun. 1999, p. 166–174.*

(List continued on next page.)

*Primary Examiner*—Theodore M. Blum
(74) *Attorney, Agent, or Firm*—Hogan & Hartson L.L.P.

(57) ABSTRACT

A system and method for central association and tracking for PCL applications is disclosed. Detection reports are received at a target tracking processing system. The detection reports include measurements correlating to line tracks associated with target echoes in earlier processing operations. In addition, other information, such as parameters and observables, are received by the target track processing system. The target track processing system performs a line track association function and a track filtering function on the line tracks according to the measurements within the detection reports. These operations also predict and estimate target parameters for tracking. Target parameters are extrapolated from the propagated and updated target tracks, and fed to a display for a user, or back into the PCL system for further processing.

67 Claims, 13 Drawing Sheets

U.S. PATENT DOCUMENTS

| | | |
|---|---|---|
| 3,786,509 A | 1/1974 | Applebaum et al. ........ 342/17.1 |
| 3,795,911 A | 3/1974 | Hammack ...................... 343/9 |
| 3,972,000 A | 7/1976 | Desblache et al. .......... 329/105 |
| 4,063,073 A | 12/1977 | Strayer ........................ 364/439 |
| 4,114,153 A | 9/1978 | Neidell .......................... 343/9 |
| 4,271,412 A | 6/1981 | Glass et al. ................ 343/5 FT |
| 4,492,990 A | 1/1985 | Johnson, Jr. .................. 360/32 |
| 4,654,696 A | 3/1987 | Dayton et al. ................ 358/11 |
| 4,837,574 A | 6/1989 | Hill .............................. 342/27 |
| 4,994,809 A | 2/1991 | Yung et al. ................. 342/108 |
| 5,058,024 A | 10/1991 | Inselberg .................... 364/461 |
| 5,127,021 A | 6/1992 | Schreiber ........................ 375/1 |
| 5,136,380 A | 8/1992 | Cho ............................ 358/141 |
| 5,173,704 A | 12/1992 | Buehler et al. ............... 342/26 |
| 5,192,955 A | 3/1993 | Hoang ......................... 342/80 |
| 5,214,501 A | 5/1993 | Cavallerano et al. ......... 358/12 |
| 5,252,980 A | 10/1993 | Gray et al. .................... 342/59 |
| 5,381,156 A | 1/1995 | Bock et al. .................. 342/126 |
| 5,414,643 A | 5/1995 | Blackman et al. |
| 5,434,570 A | 7/1995 | Wurman ....................... 342/26 |
| 5,451,960 A | 9/1995 | Kastella et al. ............... 342/59 |
| 5,452,015 A | 9/1995 | Hulyalkar .................. 348/608 |
| 5,525,995 A | 6/1996 | Benner ........................ 342/90 |
| 5,604,503 A | 2/1997 | Fowler et al. .............. 342/378 |
| 5,623,267 A | 4/1997 | Wurman ....................... 342/26 |
| 5,742,591 A | 4/1998 | Himayat et al. ............ 370/286 |
| 5,793,223 A | 8/1998 | Frankeny ...................... 326/30 |
| 5,798,942 A | 8/1998 | Danchick et al. |
| 5,909,189 A | 6/1999 | Blackman et al. |
| 5,924,980 A | 7/1999 | Coetzee ....................... 600/300 |
| 5,946,238 A | 8/1999 | Campardo et al. ........ 365/185.2 |
| 5,960,097 A * | 9/1999 | Pfeiffer et al. .............. 382/103 |
| 6,031,485 A | 2/2000 | Cellai et al. ................. 342/131 |
| 6,031,879 A | 2/2000 | Pace et al. ................... 375/316 |
| 6,052,421 A | 4/2000 | Richardson et al. ......... 375/346 |
| 6,135,952 A | 10/2000 | Coetzee ....................... 600/336 |
| 6,167,132 A | 12/2000 | Krone et al. ................. 379/399 |
| 6,269,324 B1 * | 7/2001 | Rakijas et al. .............. 702/190 |

OTHER PUBLICATIONS

Robert F. Ogrodnik, "Bistatic Laptop Radar, An Affordable, Silent Radar Alternative"; Rome Laboratory/OCSM, pp. 369–373.*

D. Poullin and M. Lesturgie, Multistatis Radar Using Non-cooperative Transmitters, Radar Multistatique a Emissions Non Cooperative, B–13 Radar System General Concepts, pp. 370–375.*

P.E. Howland, A Passive Metric Radar Using a Transmitter of Opportunity; A–12 Radar System General Concepts, pp. 251–256.*

* cited by examiner

SYSTEM AND METHOD FOR CENTRAL ASSOCIATION AND TRACKING IN PASSIVE COHERENT LOCATION APPLICATIONS

CROSS REFERENCE TO RELATED APPLICATIONS

This application claims benefit of U.S. Provisional Patent Application No. 60/288,492 entitled "System and Method for Central Association and Tracking for PCL Applications," filed May 4, 2001, which is hereby incorporated by reference.

BACKGROUND OF THE INVENTION

1. Field of the Invention

The present invention relates to a passive coherent location ("PCL") radar system and method, and more particularly, to a system and method for associating a line track with a target and tracking the target in PCL radar applications.

2. Discussion of the Related Art

PCL radar systems may be represented by a multistatic radar system. A multistatic radar system has a number of receivers that are separated from one or more transmitters. The radiated signal from a transmitter arrives at a receiver via several separate paths. One path may be a direct path from the transmitter to the receiver, and the other path may be a target path that includes an indirect path from the transmitter to a target to the receiver. Measurements may include a total path length, or transit time, of the target path signal, the angle of arrival of the target path signal, and the frequency of the direct and target path signals. A difference in frequency may be detected if the target is in motion according to a doppler effect.

Knowledge of the transmitted signal is desirable at the receiver if information is to be extracted from the target path signal. The transmitted frequency is desired to determine the doppler frequency shift. A time or phase reference also is desired if the total scattered path length is to be determined. The frequency reference may be obtained from the direct signal. The time reference also may be obtained from the direct signal provided the distance between the transmitter and the receiver is known.

Multistatic radar systems may be capable of determining the presence of a target within the coverage of the radar, the location of the target position, and a velocity component, or doppler, relative to the radar. The process of locating the target position may include a measurement of a distance and the angle of arrival. The measurement of distance relative to the receiving site may include both the angle of arrival at the receiving site and the distance between transmitter and receiver. If the direct signal is available, it may be used as a reference signal to extract the doppler frequency shift.

In PCL radar systems, transmitters may be known as illuminators. Illuminators may be wideband sources of opportunities that include commercial frequency modulated ("FM") broadcast transmitters and/or repeaters, commercial high-definition television ("HDTV") broadcast transmitters and/or repeaters, and the like. Techniques for wideband signal pre-detection processing and co-channel interference mitigation exist. Approaches may include an array of antennas used to receive the source of opportunity to be exploited, such as the primary illuminator, and any other co-channel signals present in the environment.

PCL systems may receive a multitude of direct and reflected signals from several different transmitters. The signals should be identified and associated with the appropriate target. Further, several targets may be scattering signals in different locations. The different signals and their measurement data should be associated with the appropriate target. If the target does not exist, then a new tracking may have to be implemented for the target. Conversely, old trackings should be eliminated from the system if updates are no longer being received. More efficient and expedient measurement data association may improve target tracking in PCL systems.

SUMMARY OF THE INVENTION

Accordingly, the present invention is directed to PCL applications and signal processing. Thus, a system and method for central association and tracking within PCL applications is disclosed herein.

According to an embodiment, a method for associating a line track with a target for a passive coherent location system is disclosed. The method includes receiving a detection report having the line track that corresponds to the target. The method also includes computing a target state and state covariance for measurements of the line track. The method also includes scoring the line track according to the target state and the state covariance. The method also includes assigning the line track to a target track according to the scoring.

According to another embodiment, a method for associating and tracking target data within a passive coherent location system is disclosed. The target data includes measurements. The method includes computing a target state and state covariance from the measurements. The method also includes assigning a line track correlating to the target data to a target track according to the target state and the state covariance. The method also includes initializing the target track. The method also includes initializing a filter according to the target state and the state covariance. The method also includes tracking the target track with the filter. The method also includes extrapolating the target data from the target track.

According to another embodiment, a method for associating a line track to a target track from target tracking operations within a passive coherent location system is disclosed. The method also includes determining a candidate association combination for the line track. The method also includes applying at least one gate to the candidate association combination. The method also includes estimating a target state and a state covariance for the line track. The method also includes computing a score for the candidate association combination according to the target state and the state covariance. The method also includes assigning the line track to a target track according to the score.

According to another embodiment, a method for filtering a target track correlating with a detection report having measurements associated with a target within a passive coherent location system is disclosed. The method includes computing corrections for a target state and state covariance for the detection report. The method also includes updating the target state and state covariance with the corrections. The method also includes propagating the target track with the updated target state and the updated state covariance.

According to another embodiment, a system for estimating target parameters for a target is disclosed. The system includes detection reports comprising measurements. The system also includes a line track association function to associate a line track correlating to the detection reports to a target track. The system also includes a track filtering function to propagate the target track according to the measurements. The system also includes a target extrapolation function to calculate the target parameters from the target track and the measurements.

According to another embodiment, a system for associating a line track to a target track is disclosed. The line track correlates to at least one detection report. The system includes a nonlinear least squares batch estimator to compute a target state and state covariance for measurements from the at least one detection report and to score a candidate associate combination for the line track. The system also include a line track assignment function to assign the line track according to the score for the candidate associate combination.

According to another embodiment, a system for track filtering a target track is disclosed. The target track is associated with a line track from at least one detection report. The system includes a filter to compute corrections to a target state and state covariance to update the target track using a means for computing measurement residuals and partial derivatives of measurements from the detection report. The system also includes a validity check function to check the updated target track using a velocity magnitude component and an acceleration magnitude component.

Additional features and advantages of the invention will be set forth in the disclosure that follows, and in part will be apparent from the disclosure, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which is included to provide further understanding of the invention and is incorporated in and constitutes a part of this specification, illustrates embodiments of the present invention and together with the description serves to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
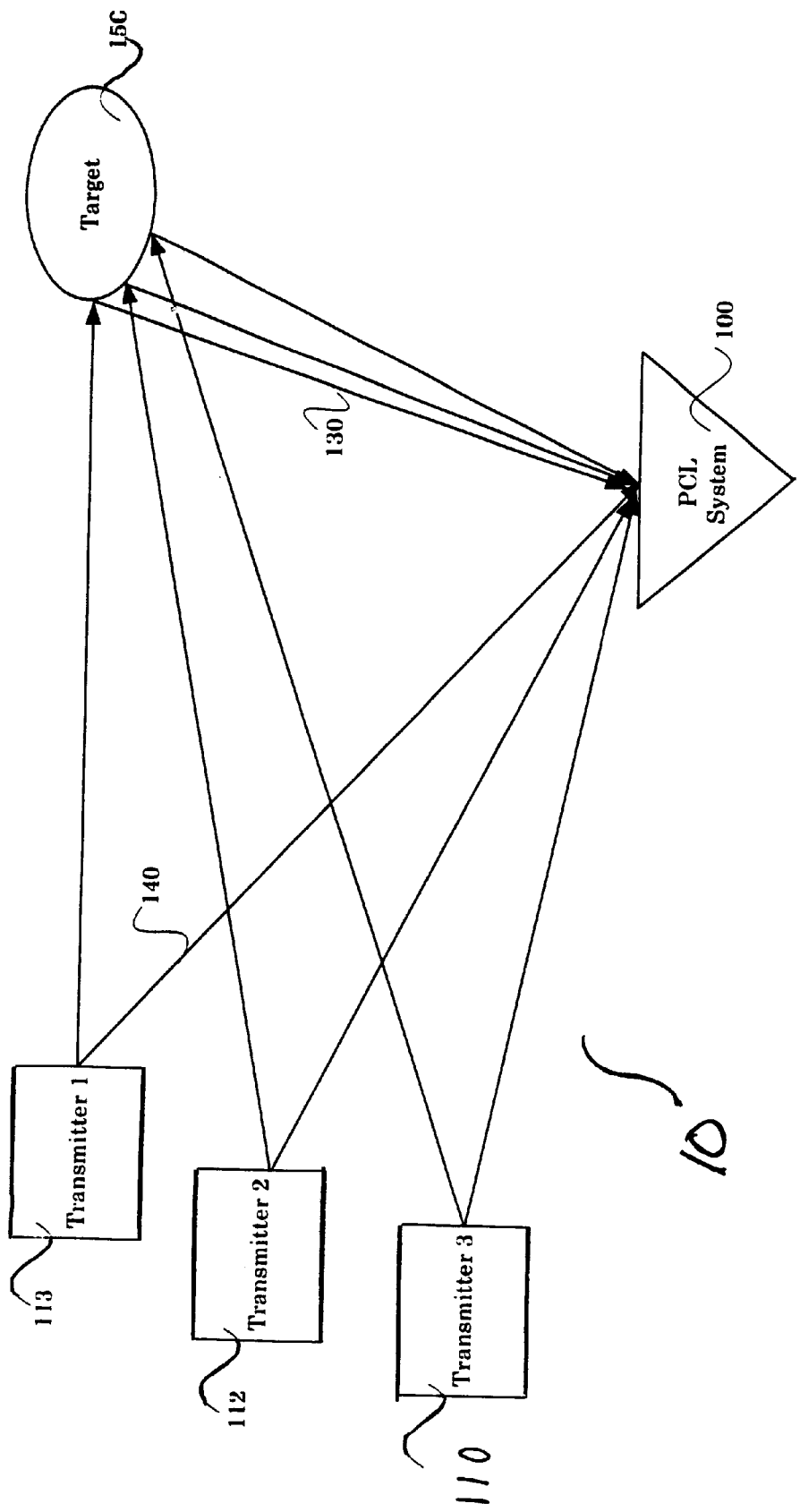
FIG. 1 illustrates a block diagram of a radar system, a target, and transmitters in accordance with an embodiment of the present invention.

FIG. 1 depicts a block diagram of a radar system, a target and transmitters in accordance with an embodiment of the present invention. Radar detection system 10 includes a PCL system 100 tracking one or more targets of interest 150 using a plurality of transmitters 110, 112, and 114. PCL system 100 represents a family of multi-static wide area target surveillance sensors. PCL system 100 exploits continuous wave ("CW") electromagnetic energy, often from sources of opportunity that may be operating for other purposes. Sources of opportunity may include television broadcast stations and FM radio stations. Preferably, PCL system 100 may receive transmissions from a plurality of uncontrolled transmitters, also known as sources of opportunity, 110, 112, and 114. An uncontrolled transmitter pertains to transmitters that are not under the direct control of the receiver. More preferably, transmitters 110, 112, and 114 may be wideband sources of opportunity that include commercial FM broadcast transmitters and/or repeaters and commercial HDTV TV broadcast transmitters and/or repeaters. Transmitters 110, 112, and 114, however, are not limited to these sources of opportunity and may include any device, system or means to transmit uncontrolled signals.

Transmitters 110, 112, and 114 may transmit wideband electromagnetic energy transmissions in all directions. Some of these transmissions are reflected by one or more targets of interest 150 and received by PCL system 100. For example, reflected transmission 130 may be reflected by target 150 and received by PCL system 100. Further, with regard to transmitter 114, reference transmission 140 is received directly by PCL system 100. PCL system 100 may compare reference transmission 140 and reflected transmission 130 to determine positional information about one or more targets of interest 150. Reference transmission 140 also may be known as a direct path signal. Reflected transmission 130 also may be known as a target path signal. Positional information may include any information relating to a position of target 150, including location, velocity, and acceleration from determining a time difference of arrival ("TDOA"), a frequency difference of arrival ("FDOA") and an angle of arrival ("AOA").

Figure 2:
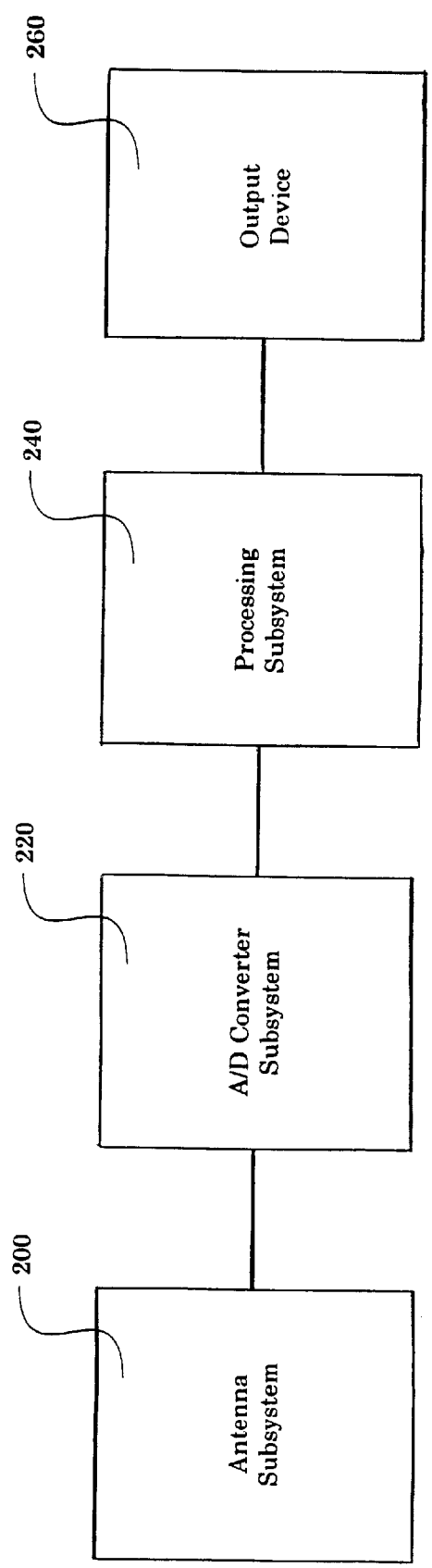
FIG. 2 illustrates a block diagram of components for a passive coherent location system in accordance with an embodiment of the present invention.

FIG. 2 depicts a block diagram of a passive coherent location system in accordance with an embodiment of the present invention. PCL system 100 may include antenna subsystem 200, analog to digital converter ("ADC") subsystem 220, processing subsystem 240, and output device 260. Antenna subsystem 200 receives electromagnetic energy transmissions, including reflected transmission 130 and reference transmission 140 of FIG. 1, with at least one antenna. Preferably, antenna subsystem 200 is an antenna array. ADC subsystem 220 receives the signal outputs of antenna subsystem 200 at its input and outputs digital samples of the signals by sampling the signals at a sampling rate and forming a digital waveform using the magnitude for the analog signal at each sampling interval. Processing subsystem 240 receives the output of assembly subsystem 220 and processes the signals for measurement data, tracking, target updates, and the like. Output device 260 receives the processing result and displays the output of processing subsystem 240.

Figure 3A:
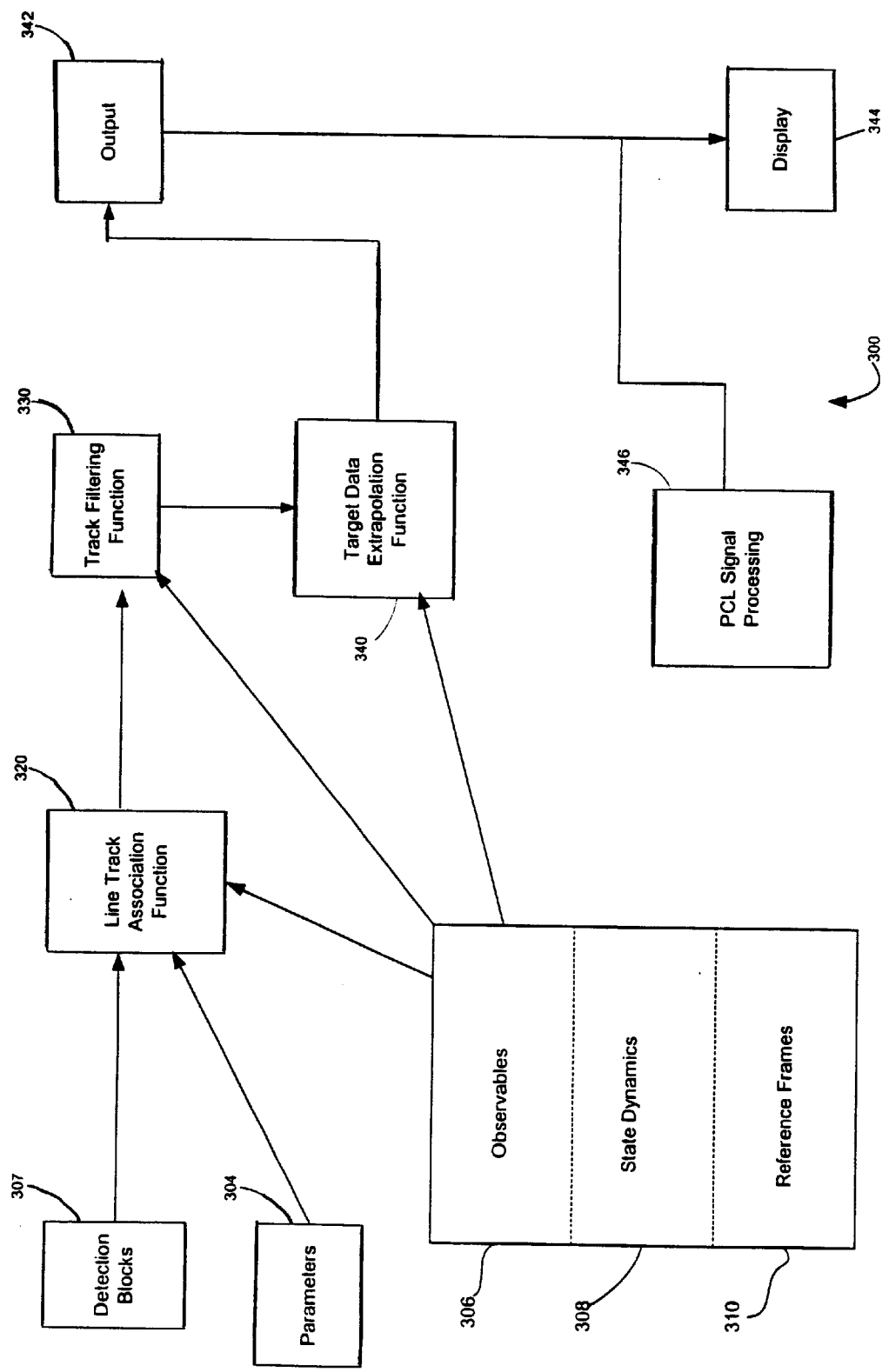
FIG. 3A illustrates a block diagram of a system for central association and tracking targets within a PCL system in accordance with an embodiment of the present invention.

FIG. 3A depicts a system for central association and tracking targets within a PCL system in accordance with an embodiment of the present invention. Target track processing system 300 provides central association and tracking for PCL applications by receiving inputs and producing an output to display 344 and to additional PCL signal processing function 346. Target track processing system 300 estimates position, velocity, and acceleration for targets detected by at least one transmitter. The position may be 3-dimensional under certain restrictions.

Target track processing system 300 may receive a stream of detection blocks 307 from a line tracker. Detection blocks 307 may contain detection reports that are identified by line track identification number, illuminator identification, and time of detection. Further, each detection report may include a state parameter that specifies that status of the line track. Inputs also may include parameters 304. Parameters 304 may be used to initialize target tracks. Parameters 304 may include location and related data for each receiver and each illuminator to be processed by target tracking processing system 300.

Target tracking processing system 300 produces output 342. Output 342 is a stream of target data blocks for the current coherent processing interval. Output 342 may be received by display 344. Display 344 may include display software and associated hardware to display the targets to a user. Further, output 342 may be received by PCL signal processing function 346, which feeds output 342 back to earlier elements of the PCL signal processing chain. Preferably, PCL signal processing function 346 feeds output 342 to processing elements for detection and feature extraction. Table 2 discloses a preferable list of output parameters for each target data block of output 342.

TABLE 2

| Parameter | Description |
|---|---|
| trg_ID | Target ID |
| lt_ID | Line track IDs associated with the target (includes illuminator IDs) |
| trg_sta | Target state (i.e.; Updated, Coasting, New) |
| trg_lat | Latitude of the target |
| trg_lon | Longitude of the target |
| trg_crs | Course |
| trg_spd | Speed |
| trg_clr | Climb rate |
| trg_slr | Slant range |
| trg_gcr | Great circle range |
| trg_brg | Bearing |
| trg_brr | Bistatic range rate per link |
| trg_alt | Altitude |
| trg_snr | Signal to noise ratio per link |
| trg_age | Age |
| trg_pwr | Signal power per link |

As shown, target tracking processing system 300 comprises three functions. Line track association function 320 makes all line track-target track assignments, handles the initialization of all new target tracks and reinitialization of existing tracks if warranted, and monitors the quality of the assignments by dissolving those assignments that become inconsistent. Track filtering function 330 utilizes an extended Kalman filter to track the position, velocity, and acceleration of each target in 2-dimensions, or, if all conditions are met, in 3-dimensions. The initial state and covariance of track filtering function 330 may be initialized by line track association function 320. Track filtering function 330 propagates each track incorporating measurements and monitors the line track association to ensure the track remains valid. Both line track association function 320 and track filtering function 330 are disclosed in greater detail below.

Target data extrapolation function 340 calculates the target data desired for display 344 from target tracking processing system 300. Target data extrapolation function 340 generates a signal for each target. The state vectors of position ("T") and velocity ("$T^2$") are used to calculate the parameters in output 342. The state vectors for the receiver position ("R") and velocity ("$R^2$") also are used. Each vector may have three variables representing individual coordinates. For example, the target position vector may be represented as $T=[x_T, y_T, z_T]$, while target velocity may be $T^2=[x_T^2, y_T^2, z_T^2]$. Target and receiver position locations may be described in the East-North-Up ("ENU") coordinate system, disclosed below. The Up coordinate in the ENU coordinate system may be defined as the zenith or as normal to the local tangent plane where the tangent plane comprises the East and North coordinates.

Two types of state vectors and associated covariances may be used in target tracking. The first is the updated state vector that is generated each time a target receives an update. The second is the propagated state vector that is the extrapolated target trajectory calculated for each coherent processing interval. The propagated state vectors and covariances may be the type of state vectors used for the calculations disclosed in Table 3 below. Line track association function 320 and track filtering function 330 seek to establish values or updates for the state vectors and covariances that are used in target data extrapolation function 340.

TABLE 3

| PARAMETER | CALCULATION |
|---|---|
| Course | $-\tan^{-1}\left(\frac{\dot{x}_T}{\dot{y}_T}\right) * RTD$ |
| Speed | $\sqrt{(\dot{x}_T)^2 + (\dot{y}_T)^2 + (\dot{z}_T)^2}$ |
| Climb Rate | $\dot{z}_T$ |
| Slant Range | $\sqrt{(x_T)^2 + (y_T)^2 + (z_T)^2}$ |
| Great Circle Range | $E_{RAD} * \cos^{-1}\left(\frac{T_{ECF} \cdot R_{ECF}}{|T_{ECF}| * |R_{ECF}|}\right)$ | where: $\overline{E}_{RAD}$ = mean earth radius
• = vector dot product
$T_{ECF}$ and $R_{ECF}$ are the target and receiver position vectors in Earth-Centered-Fixed (ECF) coordinates TABLE 3-continued

| PARAMETER | CALCULATION |
|---|---|
| Bearing | $-\tan^{-1}\left(\frac{y_T - y_R}{x_T - x_R}\right) * \text{RTD}$ |
| Bistatic Range Rate | $-\lambda(\text{fd\_update})$ where: $\lambda$ = the wavelength of the illuminator fd\_update = the updated doppler measurement |
| SNR | Provided in target data block |
| Course Uncertainty | $\frac{\sqrt{\sigma_{x_T}^2 * \dot{y}_T^2 + \sigma_{\dot{y}_T}^2 \dot{x}_T^2}}{\dot{x}_T^2 + \dot{y}_T^2} * \text{RTD};$ where: $\sigma^2$ = variance |
| Speed Uncertainty | $\frac{\sqrt{\sigma_{\dot{x}_T}^2 * \dot{x}_T^2 + \sigma_{\dot{y}_T}^2 * \dot{y}_T^2 + \sigma_{\dot{z}_T}^2 * \dot{z}_T^2}}{\dot{x}_T^2 + \dot{y}_T^2 + \dot{z}_T^2}$ where: $\sigma^2$ = variance |
| Climb Rate Uncertainty | $\sigma_{\dot{z}_T}$ |

Prior to implementing line track association function 320, certain values and additional parameters should be calculated. These values and their associated algorithms may be used by target tracking processing system 300 in determining target data. The values may be used by any of the functions of target tracking processing system 300. First, reference frames 310 may be calculated. Target tracking processing system 300 may desire manipulation between three primary reference frames. The disclosed reference frames and conversion between frames will be referred in the following disclosure with relation to reference frames 310. The following discussion discloses the reference frames 310 and the coordinate system transformations.

The Earth Centered, Fixed ("ECF") reference frame is a Cartesian reference frame defined at the geographic center of the earth. The equator may define the primary plane of the system with the primary axis pointing toward the Greenwich meridian. The ECF frame is attached to the rotating Earth. All Earth rotation effects, however, may be neglected in target tracking processing system 300.

The Geodetic ("GEO") coordinate system defines locations on the Earth's surface with respect to a reference ellipsoid. The reference ellipsoid may be taken to be the ellipsoid of revolution that best fits the mean sea level. Target tracking processing system 300 may use the values disclosed in Table 4 below, along with the relationships between the parameters.

TABLE 4

| | | |
|---|---|---|
| Mean Equatorial Radius, $r_e$ | 6378137.0 m | |
| Mean Polar Radius, $r_p$ | 6356752.3141 m | |
| A Useful Constant, u | 0.99330562 | $u = \frac{r_p^2}{r_e^2} = (1-f)^2$ |
| Eccentricity, e | 0.08181919 | $e^2 = 1 - u = f(2-f)$ |
| Flattening coefficient, f | $f^{-1}$ = 298.257223563 | $f = \frac{r_e - r_p}{r_e}$ |

The Local Tangent ("ENU") reference frame is a Cartesian reference frame defined at a point on the reference ellipsoid. The local tangent plane defines the primary plane of the system with the primary axis pointing in the local East direction. All target tracking and line track association functions for target track processing, including vehicle extrapolation and Kalman filtering, are performed in the local tangent frame of the receiver. Target tracking processing system 300 may perform functions in 2-dimensions or 3-dimensions.

For 2-dimensional target tracks, target tracking processing system 300 may incorporate a constant velocity with a straight and level flight. The straight and level flight condition follows the surface of the Earth and not the tangent plane of the receiver. Therefore, the vertical components of position and velocity may be corrected for the curvature of the Earth.

State dynamics 308 may disclose the target state vector, covariance matrix, and model for its dynamics. The model disclosed by state dynamics 308 may be defined for the East, North, and Up components in the ENU local reference frame of the receiver. In the case of 2-dimensional tracking, the target is given a specified altitude that may be corrected for the earth's curvature over the duration of its track. The target vehicle state dynamics 308 incorporates an exponentially correlated acceleration motion model.

Associated with the target state is a target state covariance matrix that reflects the uncertainty of the state values. The diagonal values of the covariance matrix represent the variance of the state values. The off-diagonal elements reflect the correlation between the states. The effects of the exponential correlated acceleration model should be included in the extrapolation of the state covariance. The covariance matrix is propagated through time using the state transition matrix and the process noise matrix.

Figure 3B:
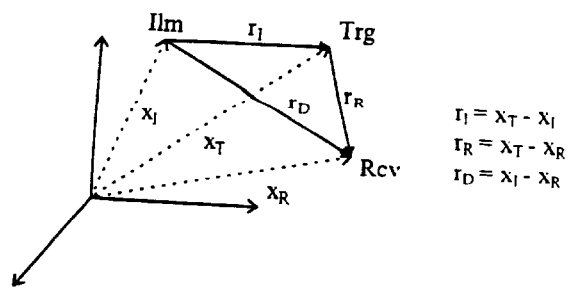
FIG. 3B illustrates an overview of the geometry used in the calculation of bistatic time delay and bistatic Doppler in accordance with an embodiment of the present invention.

Observables 306 are measurement observables used to initialize and update a target's state. The observables disclosed here may be computed for each coherent processing interval earlier in the PCL signal processing. Preferably, the observables are computed during detection and feature extraction. Observables 306 may relate to calculation of the partial derivatives of the observations with respect to the target state for each observable. The partial derivatives are used during line track association function 320 and track filtering function 330 of target tracking processing system 300. FIG. 3B depicts an overview of the geometry used in the calculation of bistatic time delay and bistatic doppler in accordance with an embodiment of the present invention.

The bistatic time delay of observables 306 reflects the difference in time of travel between the illuminator and receiver along the indirect and direct paths. According to the following equation:

$$t_d = \frac{1}{c}(d_I + d_R - d_D)$$

where c is the speed of light and the ranges between the objects are expressed as the square root of the inner products or:

$d_I = \sqrt{r_I \circ r_I}$ $d_R = \sqrt{r_R \circ r_R}$ $d_D = \sqrt{r_D \circ r_D}$ The state estimation desires the calculation of partial derivatives with respect to the target state, $x_T$. The partials of the range expressions with respect to the target state become:

$$\frac{\partial d_I}{\partial x_T} = \frac{r_I}{d_I}$$

$$\frac{\partial d_R}{\partial x_T} = \frac{r_R}{d_R}$$

$$\frac{\partial d_D}{\partial x_T} = 0$$

The expression for the partials of the bistatic time delay measurement with respect to the target state are:

$$\frac{\partial t_d}{\partial x_T} = \frac{1}{c}\left(\frac{r_I}{d_I} + \frac{r_R}{d_R}\right)$$

$$\frac{\partial t_d}{\partial \dot{x}_T} = 0$$

$$\frac{\partial t_d}{\partial a_T} = 0$$

The bistatic doppler of observables 306 reflects the change in frequency between the observed signal and the transmitted signal from an illuminator. The measurement may desire the positions and velocities of the illuminator, receiver, and target. Thus, embodiments of the present invention may utilize moving transmitters and receivers, such as on an airborne platform or an ocean going vessel. Therefore, according to the following equation:

$$f_d = -\frac{1}{\lambda}\frac{\partial}{\partial t}(d_I + d_R)$$

where $\lambda$ is the transmitting wavelength of the illuminator and the illuminator-target and receiver-target ranges are defined above. The time derivative of range ("range rate") expressions may be:

$$\dot{d}_I = \frac{1}{d_I}(r_I \circ \dot{r}_I)$$

$$\dot{d}_R = \frac{1}{d_R}(r_R \circ \dot{r}_R)$$

that results in an expression for doppler as:

$$f_d = -\frac{1}{\lambda}\left(\frac{(r_I \circ \dot{r}_I)}{d_I} + \frac{(r_R \circ \dot{r}_R)}{d_R}\right)$$

The state estimation may desire the calculation of partial derivatives with respect to the target state, $x_T$. The partials of the range rate expressions with respect to the target state may be $$\frac{\partial \dot{d}_I}{\partial x_T} = \frac{1}{d_I}\left(\dot{r}_I - \frac{\dot{d}_I}{d_I}r_I\right)$$

$$\frac{\partial \dot{d}_I}{\partial \dot{x}_T} = \frac{r_I}{d_I}$$

$$\frac{\partial \dot{d}_R}{\partial x_T} = \frac{1}{d_R}\left(\dot{r}_R - \frac{\dot{d}_R}{d_R}r_R\right)$$

$$\frac{\partial \dot{d}_R}{\partial \dot{x}_T} = \frac{r_R}{d_R}$$

The expression for the partials of the bistatic Doppler measurement with respect to the target state may be $$\frac{\partial f_d}{\partial x_T} = -\frac{1}{\lambda}\left[\frac{1}{d_I}\left(\dot{r}_I - \frac{\dot{d}_I}{d_I}r_I\right) + \frac{1}{d_R}\left(\dot{r}_R - \frac{\dot{d}_R}{d_R}r_R\right)\right]$$

$$\frac{\partial f_d}{\partial \dot{x}_T} = -\frac{1}{\lambda}\left(\frac{r_I}{d_I} + \frac{r_R}{d_R}\right)$$

$$\frac{\partial f_d}{\partial a_T} = 0$$

For television illuminators, doppler may be formed from frequency measurements of a target's echo and the illuminator carrier. Because the illuminator corresponding to target echo returns in a line track is not ambiguous, the formed doppler measurements are associated with a hypothesis that is resolved in the line track association function 320. The constructed doppler for a hypothesis may be given by $$f_d = f_r - (f_c)_r = (f - f_{LO}) - (f_c - f_{LO})$$

where $f_{LO}$ is the frequency of the oscillator ("Hz"), $f_c$ is the carrier frequency, and the subscript "r" identifies a frequency as relative to the local oscillator.

Figure 3C:
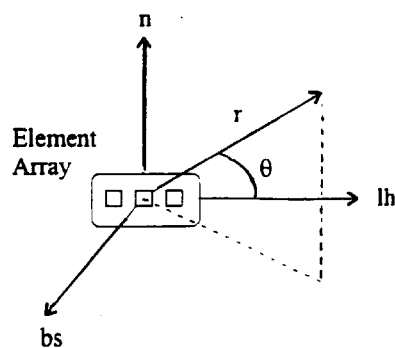
FIG. 3C illustrates an angle-of-arrival of an incoming signal in accordance with an embodiment of the present invention.

The angle-of-arrival of an incoming signal is depicted by the angle $\theta$ in the body fixed frame of the antenna, as shown in FIG. 3C. The off-boresight angle reported to target tracking processing system 300 is the complement of the angle-of-arrival, or $\theta_{ob} = \theta - (\pi/2)$. The angle-of-arrival calculation may desire the position of the target and the orientation of the antenna array left hand axis, or $$\cos\theta = \frac{r_R \circ 1h}{d_R}.$$

where lh is the left hand axis unit vector. The state estimation may desire the calculation of partial derivatives with respect to the target state, $x_T$. The partials of the angle-of-arrival expressions with respect to the target state are $$\frac{\partial \theta}{\partial x_T} = \frac{1}{d_R \sin\theta}\left(\cos\theta\frac{x_R}{d_R} - 1h\right)$$

The bistatic time delay, bistatic doppler, and angle-of-arrival of observables 306 correlate to the time delay, doppler, and angle-of-arrival disclosed with reference to FIGS. 1 and 2. Target tracking processing system 300, however, uses these values, as disclosed below. The state expression and partials are used by target tracking processing system 300 to update and propagate the vectors, and, therefore, are disclosed with reference to FIGS. 3A, 3B, and 3C.

Figure 4:
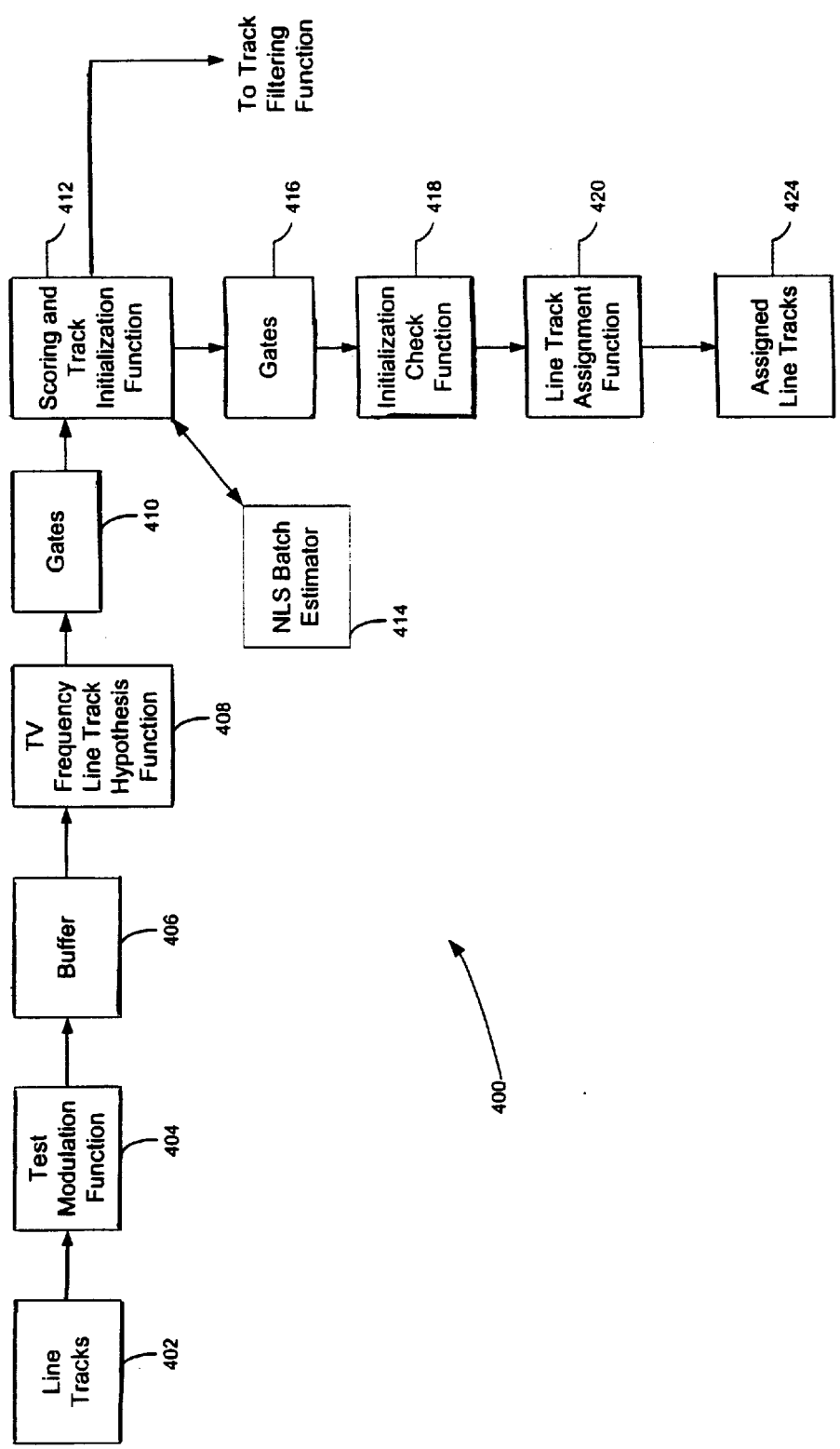
FIG. 4 illustrates a line track association function in accordance with an embodiment of the present invention.

FIG. 4 depicts a line track association function in accordance with an embodiment of the present invention. FIG. 4 depicts line track association function 400 that correlates to line track association function 320 of FIG. 3. Line track association function 400 discloses a preferred embodiment of line track association function 320. Line track association function 320, however, is not limited by the embodiments disclosed by FIG. 4. Line track association function 400 seeks to all line track-to-target track assignments, to handle the initialization of all new target tracks and reinitialization of existing tracks if warranted, and to monitor the quality of the assignments by dissolving those assignments that become inconsistent. Gating operations may be used to reduce the number of candidate assignments to be scored and evaluated by line tracking association function 400. The candidate assignments passing the gates are scored and provided as input to the assignment algorithm that makes the assignments based on the scores. At the current time, t, the assignment algorithm is applied prior to the Kalman filter's measurement update at time t in track filtering function 330.

Prior to line track association, certain conditions may be met to process the line track in a more efficient manner. Modulation line test function 404 receives line tracks 402. All FM line tracks should pass this test before line tracks 402 are allowed to participate in the line track association process. Modulation line test function 404 determines if the line track of line tracks 402 was generated by a blade modulation line, and, if so, to prevent its use in line track association. A blade modulation line may be associated with rotor blades of an aircraft or vehicle, and may be known to one skilled in the art. Modulation line test function 402 looks at the delta-delay time-series history obtained from integrated doppler and from delay differences. If the line track of line tracks 402 is a modulation line characterized by a doppler shift relative to the doppler due to body motion, the difference between the two delta-delay sequences may evolve with a linear runoff, or slope. By detecting the slope, a blade modulation line track is identified and may be removed from further line track association operations.

Buffer 406 may buffer detection reports of line tracks 402 after the modulation line test. Buffer 406 preferably is a first-in, first-out buffer for detection reports that are associated for each unique line track. Buffer 406 may mark the line track for the correlating detection reports as "available for line track association" when a minimum number of detection reports, or $N_{BF}$, have been accumulated in buffer 406. In subsequent line track association operations, line track association function 400 may consider those line tracks that have been marked for further processing. The size of the queue for buffer 406 may be independent of $N_{BF}$ but, preferably, the size may be equal to or greater than $N_{BF}$. All of the detection reports of line tracks 402 in the queue for buffer 406 may be used in the scoring computation of line track association function 400, as disclosed below. For television signals, the preferable buffer size is 1.5 $N_{BF}$.

Detection reports of line tracks 402 may be added to buffer 406 if the line track state is 1–3 within the queue. The line track state correlates to the number of detection reports in buffer 406 correlating to the particular line track. When line track state 4 is reached, then line track termination is enacted. Buffer 406 performs certain housekeeping operations to remove its association with any currently active target track and to set the corresponding target track state to "coast" state if the target track has no remaining associated line tracks as a result of the line track removal from buffer 406 for further line track association operations.

Line track association function 400, after modulation testing and buffering, may consider specified candidate association combinations ("CACs"). For example, there may be three types of CACs. The first CAC may be a current track I with line track j, or TL(I,j). The second CAC may be a new track from line tracks I and j, or LL(I,j). The third CAC may be a new track from line track I, or L(i). Processing within line track association function 400 may be restricted to those line tracks that are marked available for line track association, are not assigned currently to a target track, or are assigned to a target track that has never had any other line track assignments, and have a current detection report. Further, line track association operations may be restricted to those unassigned line tracks from link having TDOA measurements, such as links with television illuminators to the TL(I,j) type. Line track processing may be restricted to optimize the functions within line track association function 400. These restrictions, however, may not be implemented, and all line tracks may be considered for line track association processing. Moreover, additional or different restrictions may apply to the line tracks to optimize line track association operations.

Three passes may be performed through line track association function 400. These "passes" may include gating, scoring and assignment algorithms using unassigned FM line tracks. In the first pass, the TL(I,j) combinations may be processed. At the end of this pass, those line tracks may be removed that have been assigned during this pass from further consideration. In the second pass, the LL(i,j) combinations may be processed by line track association function 400. At the end of this pass, those line tracks may be removed that have been assigned during this pass from further consideration. In the third pass, the remaining L(i) CACs may be processed. A fourth pass may be made to process the newly updated TL(I,j) combinations, but now considering those unassigned line tracks without TDOA measurements, such as those correlating to television illuminators. The gating, scoring, assignment, and new track initialization algorithms within line track association function 400 are disclosed in greater detail below.

Television frequency line track hypothesis function 408 may resolve those line tracks where the illuminator associated with a frequency line track from a television radio-frequency channel is assumed to be ambiguous whenever multiple television illuminators have been identified with the channel. To handle this scenario, each frequency line track may be associated with an illuminator hypothesis for each of the identified television illuminators. The ambiguity is assumed to be resolved when the line track under a particular illuminator has been successfully associated with an existing target. Preferably, only TL(I,j) combinations are considered. When this occurs, the transmitter identification field may be updated in all detection reports associated with the line track.

The range rate measurements may be constructed for each hypothesis because the hypothesis should depend on the location and carrier frequency of the illuminator associated with the hypothesis. The construction may be as follows. Let n=(tid, rid) be the link index referring to transmitter node "tid" and receiver node "rid". A particular TL(I,j) may be considered such as target $T_i$ and television frequency line track $L_j$ at time $t_k$ under hypothesis n. For this hypothesis, the constructed range rate measurement for the line track and the predicted range rate measurement for the target may be given by:

$$y_{jn} = -\lambda_n \lfloor (f_r)_j - (f_{r,c})_n \rfloor$$

$$\hat{y}_{in} = \bar{V}_i \cdot \bar{B}_{in} = \bar{V}_i \cdot (\hat{r}_{rx,in} + \hat{r}_{tx,in})$$

where $(f_r)_j$ is the relative frequency measurement from line track j, $(f_{r,c})_n$ is the relative frequency of the carrier under hypothesis n, XX is the velocity vector for target "I", and $\bar{V}_i$ is the bistatic vector associated with target I under hypothesis n. The bistatic vector, $\bar{B}_{in}$, may be defined as the sum of the unit vectors pointing from receiver-to-target and illuminator-to-target. This hypothesis may desire that the associated carrier line track has a relative frequency measurement for the carrier. The residual measurement may be defined as $\delta y_{ijn} = y_{jn} - \hat{y}_{jn}$. Gating tests may be applied to this residual measurement and its associated covariance matrix S disclosed below.

Gates 410 may be applied prior to scoring in order to reject unlikely CACs from further processing. Gates 410 seek to reduce the processing load on line track association function 400. Any CAC failing a gate of gates 410 may be removed at the earliest opportunity to increase processing efficiency and to reduce extraneous line track processing. Gates 410 may be known as pre-scoring gates. Gates 410 may include a link gate that allows at most one line track from any link in a CAC. A link gate of gates 410 may remove CACs having multiple line tracks from a common link from further processing during the current pass of the line track association operations.

Gates 410 also may include a normalized innovations squared gate that applies the normalized innovations squared gate for the TL(I,j) passes. The normalized innovations squared gate of gates 410 may utilize the two-dimensional state vector and covariance of T(i) and the measurement data in the buffered detection reports for L(j) in the computation for passing the line tracks. The normalized innovations squared gate of gates 410 may incorporate the following steps in evaluating the line tracks. First, the doppler residuals, or y, and the doppler partials, or H, may be computed for the line track as disclosed above. Next, the measurement predicted covariance matrix S may be computed as follows:

$$S = H\bar{P}H^T + R$$

where $\bar{P}$ is the a priori two-dimensional state covariance from the existing target, H is the measurement partial matrix for the line track, and R is the measurement noise matrix for the line track. Next, the normalized innovations squared $\epsilon$ may be computed and the following gating criterion applied:

$$\epsilon = y^T S^{-1} y < \gamma$$

where $\gamma$ may be the configurable number of sigmas squared to be used for gating the measurement type of interest. These steps may be repeated for time delay Doppler shift, and off-boresight angle, if they are available.

Gates 410 may include a two-dimensional position wedge gate. The two-dimensional position wedge gate of gates 410 may be applied to LL(I,j) combinations that have bistatic range and off-boresight measurements. The wedge gate pass criteria may be as follows:

$$|\theta_i - \theta_j| \leq \eta_\theta$$

$$|R_i - R_j| \leq \eta_R$$

where $$R = \frac{.5 r_b (r_b + 2 R_d)}{r_b + (1 - \cos\gamma) R_d}$$

and where theta is the cone angle-of-arrival measurement, R is the range of the scattered signal target-to-receiver, $R_d$ is the direct path from illuminator to target, gamma is the angle between the receiver-to-target and receiver-to-illuminator rays, and $r_b$ is the bistatic range measurement. The gating tests of gates 410 may use the average of the bistatic range and angle measurements over the time interval common to both L(i) and L(j), where L(i) and L(j) are line tracks.

After applying gates 410, scoring and track initialization function 412 may initialize two-dimensional target tracks using a batch nonlinear least squares ("NLS") operation and computes a score based on the batch fit. Scoring and track initialization function 412 may be a callable module. The operations of scoring and track initialization function 412 estimates an initial state vector and covariance matrix based on the buffered detection reports from one or more line tracks. Scoring and track initialization function 412 may perform two services. Scoring and track initialization function 412 may compute scores for CACs and also provide track initialization data. The track initialization data may be used when new tracks are formed or old tracks are reinitialized.

Scoring and track initialization function 412 incorporates NLS batch estimator 414 to compute a score "s" for a proposed association of a television line track with an existing target track. NLS batch estimator 414 computes a target state and state covariance for the measurements from the detection reports in buffer 406 of one or more line tracks. These computations may be forwarded to track filtering function 330. NLS batch estimator 414 also computes a score using an NLS algorithm. Preferably, NLS batch estimator 414 is incorporated within scoring and track initialization function 412. The operations and functions of scoring and track initialization function 412 and NLS batch estimator 414 are disclosed in greater detail below with reference to FIG. 6.

After scoring, gates 416 may be applied. Gates 416 may be known as post-scoring gates. Post-scoring gates may test the normalized chi-square score against an user supplied threshold. Gates 416 may discard those CACs that have a score that fails the gate criterion, or $s \leq \epsilon_{ncs}$. A second test of gates 416 may consider the closeness of the television line track to the existing target track. This test may be successful if the mean square distance is less than the square of the configurable RMS association gate, or $s_2 < \eta_{rmsag}^2$. If this test fails, the fit may be aborted and the proposed association may be rejected. Thus, gates 416 may optimize further the line track association operations of line track association function 400 by removing those line track associations that fail the scoring criterion specified by a user.

After initialization of a single link new target in scoring and track initialization function 412, track initialization check function 418 may check that the normalized chi-square score satisfies the relationship $s \leq \epsilon_{NCS\_SNGL}$. If the check fails, then delete the new target track and pass its associated line track on so it may try to initialize at the next coherent processing interval. For state reinitialization from one to two FM links, initialization check function 418 may ensure that the velocity and acceleration magnitudes satisfy the relationships:

$$v \circ \vec{v} \leq \gamma_{vel}$$

$$a \circ \vec{a} \leq \gamma_{acc}$$

where $\vec{v}$=the two-dimensional or three-dimensional velocity vector of the target state solution, $\vec{a}$=the two-dimensional or three-dimensional acceleration vector of the target state solution, and $\gamma_{vel}$, $\gamma_{acc}$=target velocity and acceleration thresholds, respectively. If either check of initialization check function 418 fails, then the new target track may be deleted and the associated line track may be passed on so it may try to initialize at the next coherent processing interval update.

Line track assignment function 420 may apply an assignment algorithm to the CACs, sequentially by type. Preferably, the following order may be implemented: TL(I, j), LL(I,j) and L(i). The CAC list includes those that have passed all the gates, such as gates 410 and gates 416. The algorithm may have the order disclosed below. First, line track assignment function 420 may make the assignment indicated by the CAC with the lowest score in the list of accepted CAC from initialization check function 418.

Second, line track assignment function 420 may remove from the list those CACs that utilize one or more of the line tracks assigned above, or that would violate the link gate because of the new assignment performed above. Third, line track assignment function 420 may repeat the first and second disclosed steps until all line tracks in the list have been assigned. The preferred order may be followed in executing these steps in generating assigned line tracks 424. Thus, assigned line tracks 424 may be output from line track association function 400.

Thus, in summary, line track association function 400 gates, scores, and assigns line track by using CACs. The gating operations seek to remove those line tracks that may result in unnecessary processing or errors. Line track association function 400 scores each CAC using NLS batch estimator 414. Using the scores, line track association function 400 assigns the line tracks appropriately. Preferably, the CAC with the lowest score is assigned first.

Figure 5:
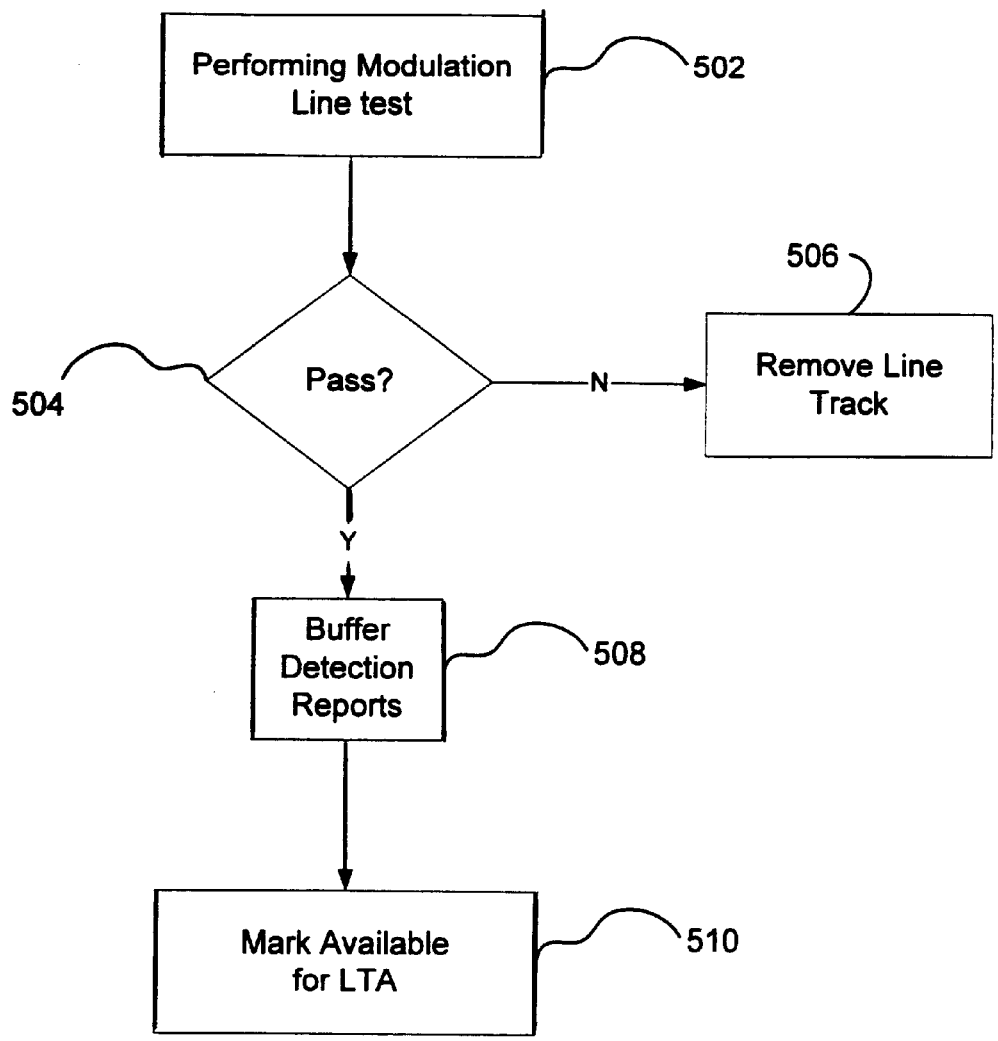
FIG. 5 illustrates a flowchart for line track association operations in accordance with an embodiment of the present invention.

FIG. 5 depicts a flowchart for pre-processing line tracks prior to line track association operations in accordance with an embodiment of the present invention. Step 502 executes by performing a modulation line test. This step determines if the line track under scrutiny is generated by a blade modulation line, such as a propeller. The test may determine if the delta-delay time-series history obtained from integrated doppler and from delay differences evolve into a linear runoff. Step 504 executes by determining if the line track is generated by a blade modulation line, as disclosed above. If yes, then step 506 executes by removing the line track. If yes, then step 508 executes by buffering the detection reports for the line track in a first-in, first out queue. Step 510 executes by marking the line track within the buffer available for line track association operations.

Figure 6:
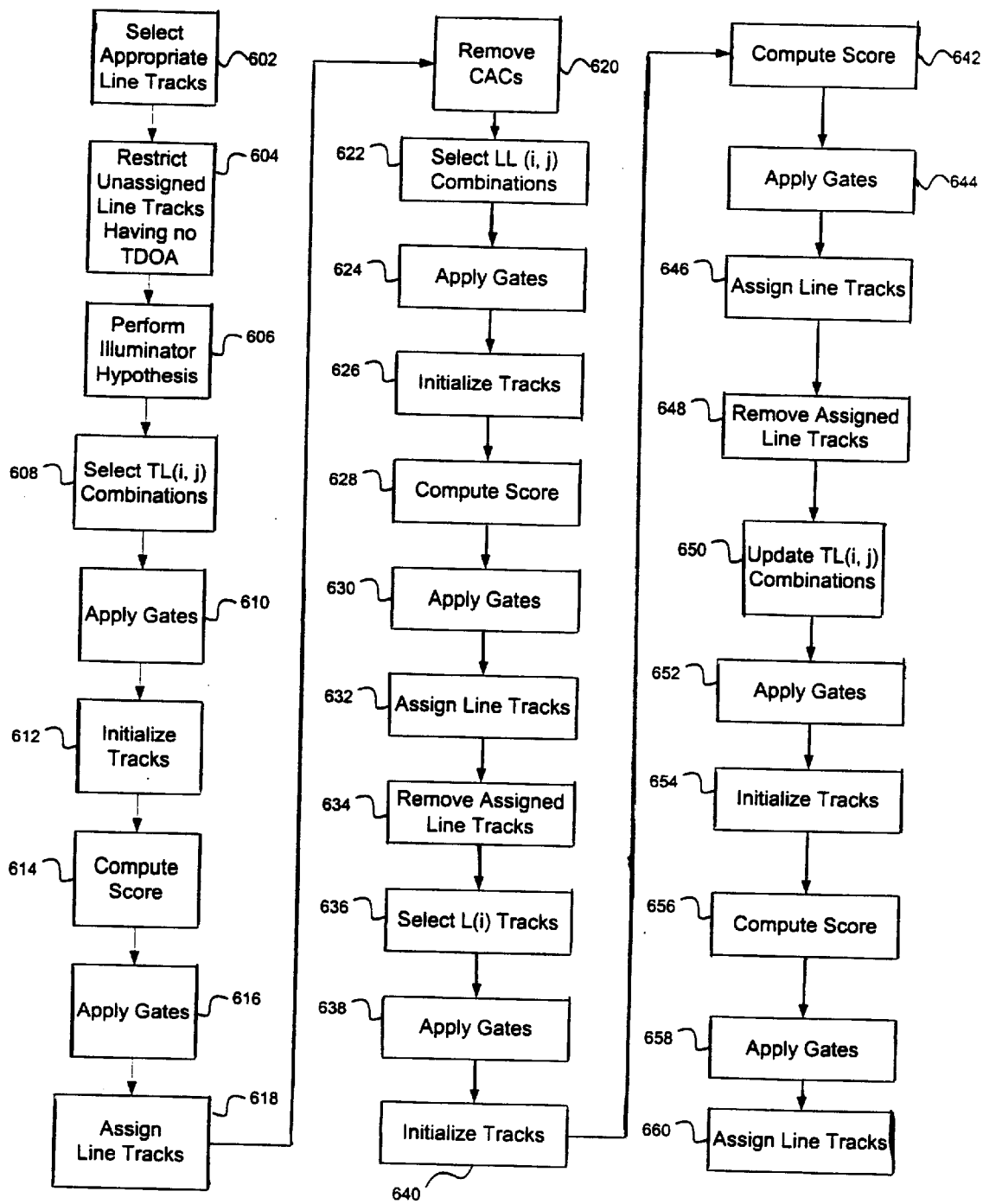
FIG. 6 illustrates a flowchart for line track association operations in accordance with another embodiment of the present invention.

FIG. 6 depicts a flowchart for line track association operations in accordance with another embodiment of the present invention. The operations and steps disclosed with reference to FIG. 6 may correlate to the features disclosed by FIG. 4. Step 602 executes by selecting appropriate line tracks for association operations. Line tracks may be marked as available for line track association after passing through a buffer, such as buffer 406. Line tracks that are marked available for line track association preferably have met specified criteria, such as the modulation line test. Other criteria may include not being assigned to a target track or are being assigned to a target track that does not have any other line track assignments. Another possible criterion may be that the line track have a current detection report.

Step 604 executes by restricting those unassigned line tracks having no TDOA measurements to the TL(I,j) CAC. Line tracks having no TDOA measurements may be links with television illuminators. Step 606 executes by performing illuminator hypothesis operations for channels that have identified multiple possible television illuminators. The functions performed in this step are disclosed in greater detail with reference to television frequency line track hypothesis function 408 of FIG. 4 above.

Step 608 executes by selecting TL(I,j) CACs for line track association operations. TL(I,j) CACs correlate to those combinations where the current track i is combined with line track j. In steps 610–620, TL(i,j) CACs may be processed according to embodiments of the present invention, as disclosed in greater detail below. Step 610 executes by applying pre-scoring gates to the line tracks. With reference to FIG. 4, gates 410 are applied, and may include a line gate, a normalized innovations squared gate, a two-dimensional position wedge gate, and the like. The line tracks may be removed from further consideration if they do not pass the gates' criteria.

Step 612 executes by initializing the target tracks using a batch NLS operation. Track initialization data may be provided by this step. The track initialization data may be used when new track are formed or old tracks are reinitialized. Step 614 executes by computing a score based on the batch fit of the initialized target tracks. An initial state vector and a covariance matrix may be estimated based on the buffered detection reports from one or more line tracks. Score computation operations are disclosed in greater detail below.

Step 616 executes by applying post-scoring gates to the scored CACs, such as gates 416. The post-scoring gates may reject those CACs that fail scoring criterion. Step 618 executes by assigning the line tracks based on the CAC scores. As disclosed above, a preferred order may be implemented amongst the CACs. According to the disclosed embodiment, this step considers TL(i,j) combinations. The TL(i,j) CAC with the lowest score is assigned. Preferably, only those CACs that have passed all gates are considered. Step 620 executes by removing those CACs that utilize one or more of the line tracks assigned in step 618. Steps 618 and 620 may be repeated until all TL(i,j) combinations are assigned.

Step 622 executes by selecting LL(i,j) CACs for line track association operations. LL(i,j) CACs correlate to those combinations where a new target track is established from line tracks I and j. In steps 624–634, LL(i,j) CACs may be processed according to embodiments of the present invention, as disclosed in greater detail below. Step 624 executes by applying pre-scoring gates to the line tracks. With reference to FIG. 4, gates 410 are applied, and may include a line gate, a normalized innovations squared gate, a two-dimensional position wedge gate, and the like. The line tracks may be removed from further consideration if they do not pass the gates' criteria.

Step 626 executes by initializing the target tracks using a batch NLS operation. Track initialization data may be provided by this step. The track initialization data may be used when new track are formed or old tracks are reinitialized. Step 628 executes by computing a score based on the batch fit of the initialized target tracks. An initial state vector and a covariance matrix may be estimated based on the buffered detection reports from one or more line tracks.

Step 630 executes by applying post-scoring gates to the scored CACs, such as gates 416. The post-scoring gates may reject those CACs that fail scoring criterion. Step 632 executes by assigning the line tracks based on the CAC scores. As disclosed above, a preferred order may be implemented amongst the CACs. According to the disclosed embodiment, this step considers LL(i,j) combinations. The LL(i,j) CAC with the lowest score is assigned. Preferably, only those CACs that have passed all gates are considered. Step 634 executes by removing those CACs that utilize one or more of the line tracks assigned in step 632. Steps 632 and 634 may be repeated until all TL(i,j) combinations are assigned.

Step 636 executes by selecting L(i) CACs for line track association operations. L(i) CACs correlate to those combinations where a new target track i is established from line track i. In steps 638–648, L(i) CACs may be processed according to a disclosed embodiment of the present invention. Step 638 executes by applying pre-scoring gates to the line tracks. With reference to FIG. 4, gates 410 are applied, and may include a line gate, a normalized innovations squared gate, a two-dimensional position wedge gate, and the like. The line tracks may be removed from further consideration if they do not pass the gates' criteria.

Step 640 executes by initializing the target tracks using a batch NLS operation. Track initialization data may be provided by this step. The track initialization data may be used when new track are formed or old tracks are reinitialized. Step 642 executes by computing a score based on the batch fit of the initialized target tracks. An initial state vector and a covariance matrix may be estimated based on the buffered detection reports from one or more line tracks.

Step 644 executes by applying post-scoring gates to the scored CACs, such as gates 416. The post-scoring gates may reject those CACs that fail scoring criterion. Step 646 executes by assigning the line tracks based on the CAC scores. As disclosed above, a preferred order may be implemented amongst the CACs. According to the disclosed embodiment, this step considers L(i) combinations. The L(i) CAC with the lowest score is assigned. Preferably, those CACs that have passed all gates are considered. Step 648 executes by removing those CACs that utilize one or more of the line tracks assigned in step 646. Steps 646 and 648 may be repeated until all L(i) combinations are assigned.

Step 650 executes by updating those TL(i,j) combinations that were restricted in step 604. These combinations correlate to line tracks from links having no TDOA measurements, such as links with television illuminators. Now that these CACs are updated, they may be eligible for line track association operations. In steps 652–660, the updated TL(i,j) CACs may be processed according to embodiments of the present invention, as disclosed in greater detail below. Thus, step 652 executes by applying pre-scoring gates to the line tracks. With reference to FIG. 4, gates 410 are applied, and may include a line gate, a normalized innovations squared gate, a two-dimensional position wedge gate, and the like. The line tracks may be removed from further consideration if they do not pass the gates' criteria.

Step 654 executes by initializing the target tracks using a batch NLS operation. Track initialization data may be provided by this step. The track initialization data may be used when new track are formed or old tracks are reinitialized. Step 656 executes by computing a score based on the batch fit of the initialized target tracks. An initial state vector and a covariance matrix may be estimated based on the buffered detection reports from one or more line tracks.

Step 658 executes by applying post-scoring gates to the scored CACs, such as gates 416. The post-scoring gates may reject those CACs that fail scoring criterion. Step 660 executes by assigning the line tracks based on the CAC scores. As disclosed above, a preferred order may be implemented amongst the CACs. According to the disclosed embodiments, this step considers the updated TL(i,j) combinations. The updated TL(i,j) CAC with the lowest score is assigned. Preferably, only those CACs that have passed all gates are considered. Step 660 may be repeated until all remaining combinations are assigned.

Although FIG. 6 was disclosed in a specified order, embodiments of the present invention are not limited by the preferred embodiment. The applying gates, initializing, and scoring steps may be executed simultaneously with the assigning steps executed according to a preferred order. Further, once the CACs are assigned, the CACs preferably are removed from further target track association consideration.

Figure 7:
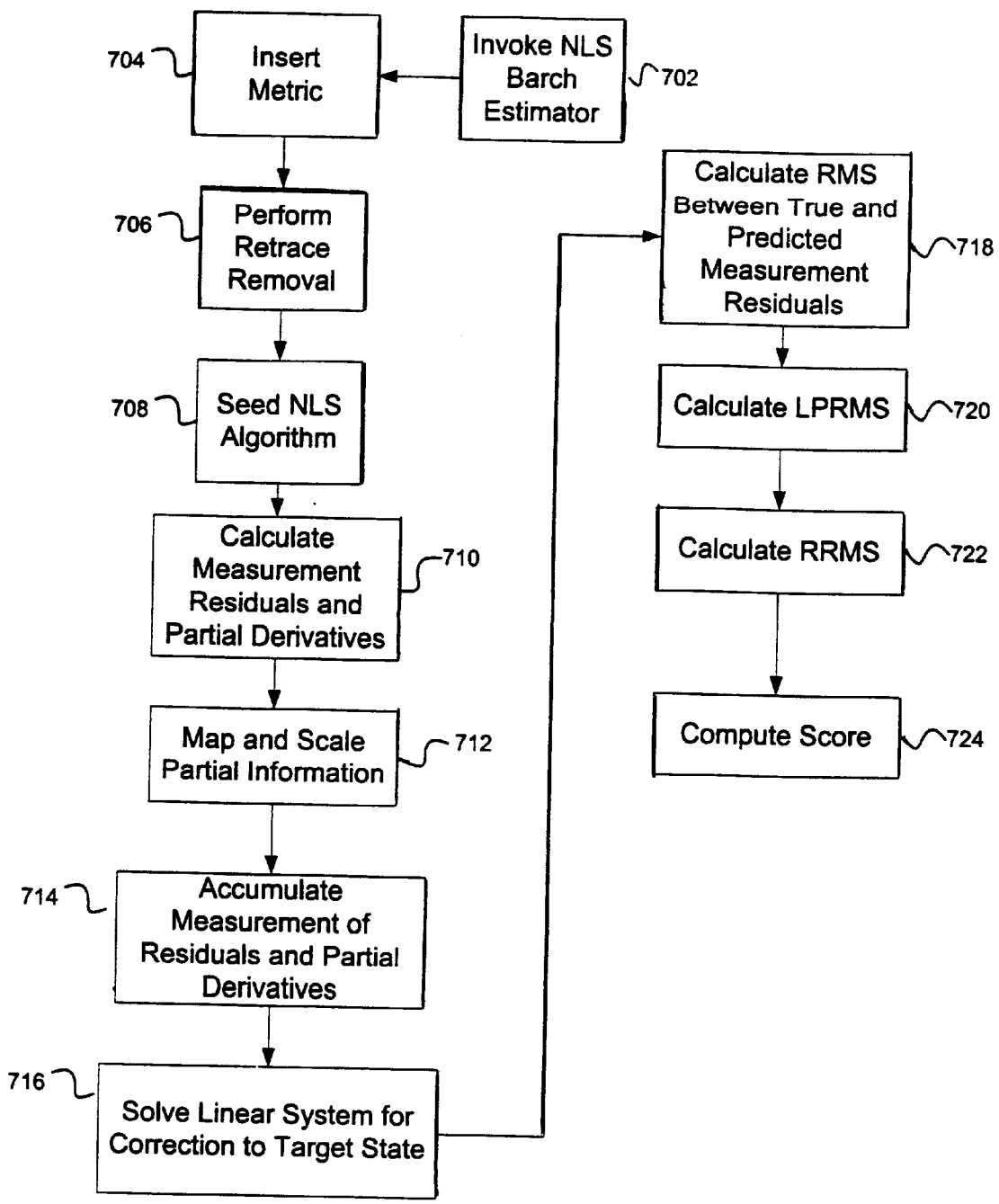
FIG. 7 illustrates a flowchart for initializing and scoring target tracks in accordance with an embodiment of the present invention.

FIG. 7 depicts a flowchart for initializing and scoring target tracks in accordance with an embodiment of the present invention. Step 702 executes by invoking the NLS batch estimator for performing scoring operations. Step 704 executes by inserting a metric for associating a television line track to an existing target track. Preferably, additional operations may be executed for scoring when associating a television line track to an existing target track. At the point when the NLS batch estimator, such as NLS batch estimator 414, is queried to compute a score "s" for a proposed association of a television line track with an existing target track, an additional metric may be implemented. The metric indicates the closeness of the television line track to the existing target track via a mean squared residual prior to performing the NLS fit to compute the score. The mean squared distance may be computed by:

$$s_2 = \frac{1}{n_2} \sum_{k \in K_2} y_k^2$$

where $K_2$ is the index set of measurements belonging to the television line track under consideration, and $n_2$ is the number of measurements in $K_2$. The distance is computed using the normalized residuals $y_k$ as computed early in the NLS batch fit prior to the first iteration.

Step 706 executes by performing retrace removal operations. When the age of a line track is greater than a threshold $\eta_{age}$ and the frequency rate ($S_\upsilon$) is less than the threshold $\eta_\upsilon$, that is in units of Hz/sec, the line track may be considered to be a retrace line and is flagged as unusable. The values for the retrace removal analysis may be calculated by:

$$S_\upsilon = \alpha S_\upsilon + (1-\alpha)\left|\frac{\Delta \upsilon}{\Delta t}\right|$$

where $\alpha = e^{-\Delta t/\tau}$ and $\Delta \upsilon = \Delta$ (successive frequency measurements)

$\Delta t$=time step of successive frequency measurements.

Step 708 executes by seeding the NLS algorithm. The NLS algorithm is an iterative process that may desire an initial seed of the target state and state covariance. The initial seed of target position may be a point computed by the observation-state mapping using the first detection in the batch. The initial velocity and accelerations are set to zero. The initial seed of target state covariance may be derived from the set of configuration parameters specifying the initial position, velocity, and acceleration standard deviations, or $\sigma_r$, $\sigma_i$, and $\sigma_a$. These relationships may be shown as:

$$d_R = \frac{1}{2} \frac{ct_d(ct_d + 2d_D)}{[d_D(1-\cos\gamma) + ct_d]}$$

$$x = d_R \sin(\theta_{ob} + \theta_{bs})$$

$$y = d_R \cos(\theta_{ob} + \theta_{bs})$$

where $t_d$=time delay measurement (sec), $\theta_{ob}$=cone angle measurement$-\pi/2$ (approximate target azimuth relative to boresight in radians), and $\theta_{bs}$=boresight azimuth is radians.

As disclosed above, the NLS batch estimator is invoked to compute a target state and state covariance for the measurements from the detection reports in the buffer of one or more line tracks. Step 710 executes by calculating measurement residuals and partial derivations. For each detection, the measurement residuals and partial derivatives may be calculated by the following:

$$y_k = Y_k - G_k$$

-continued
$$\tilde{H}_k = \frac{\partial G_k}{\partial X_T} = \begin{bmatrix} \frac{\partial G_k}{\partial x_T} & \frac{\partial G_k}{\partial \dot{x}_T} & \frac{\partial G_k}{\partial a_T} \end{bmatrix}$$

where $Y_k$ is the actual measurement, $G_k$ may be the computed measurement, and $$\frac{\partial G_k}{\partial X_T}$$

may be the partial derivative expressions developed above.

Step 712 executes by mapping and scaling partials information. The partial information may be mapped back to the final coherent processing interval using $$H_k = \tilde{H}_k \Phi(t_k, t_i)$$

and scaled according to the measurement standard deviation as $$y_k = \frac{1}{\sigma} y_k$$
$$H_k = \frac{1}{\sigma} H_k$$

Step 714 executes by accumulating measurement residuals and partial derivatives. The measurement residuals and partial derivatives may be accumulated into the set of normal equations, such as $$M = \sum_{k=1}^{n} H_k^T H_k$$
$$N = \sum_{k=1}^{n} H_k^T y_k$$

Step 716 executes by solving the linear system for the correction to the target state. The correction to the target state may be computed by solving the linear system $\hat{X} = M^{-1}N$, where the matrix $M^{-1}$ is the calculated state covariance for the current iteration.

The convergence of the estimate may be determined by calculating the root-mean-square("RMS"), the linear predicted root-mean-square ("LPRMS") and the relative root-mean-square ("RRMS"). The followings steps disclose the preferred embodiments in calculating the above values. Step 718 executes by calculating the RMS between true and predicted measurement residuals. The RMS is the square root of the mean squared errors between the true and predicted measurement residuals and may be calculated as $$RMS = \sqrt{\frac{\sum_{k=1}^{n} y_k^2}{n}}.$$

Step 720 executes by calculating the LPRMS. The linear predicted RMS may be the estimate of the RMS after the application of the state update. The LPRMS may be calculated according to $$LPRMS = \sqrt{\frac{\sum_{k=1}^{n} y_k^2 - \hat{X} \circ N}{n}}.$$

Step 722 executes by calculating the RRMS. The relative RMS may be computed and tested against a user-specified threshold for convergence according to $$RRMS = \frac{RMS - LPRMS}{RMS} \leq \varepsilon_{rms}.$$

If the solution has not converged, the state update may be added to the initial state and the process is repeated until the solution converges or the maximum number of iterations, $I_{BF}$, has been reached.

Step 724 executes by computing the score according to $$s = \frac{\sum_{k=1}^{n} y_k^2 - n}{\sqrt{2n}}.$$

Figure 8:
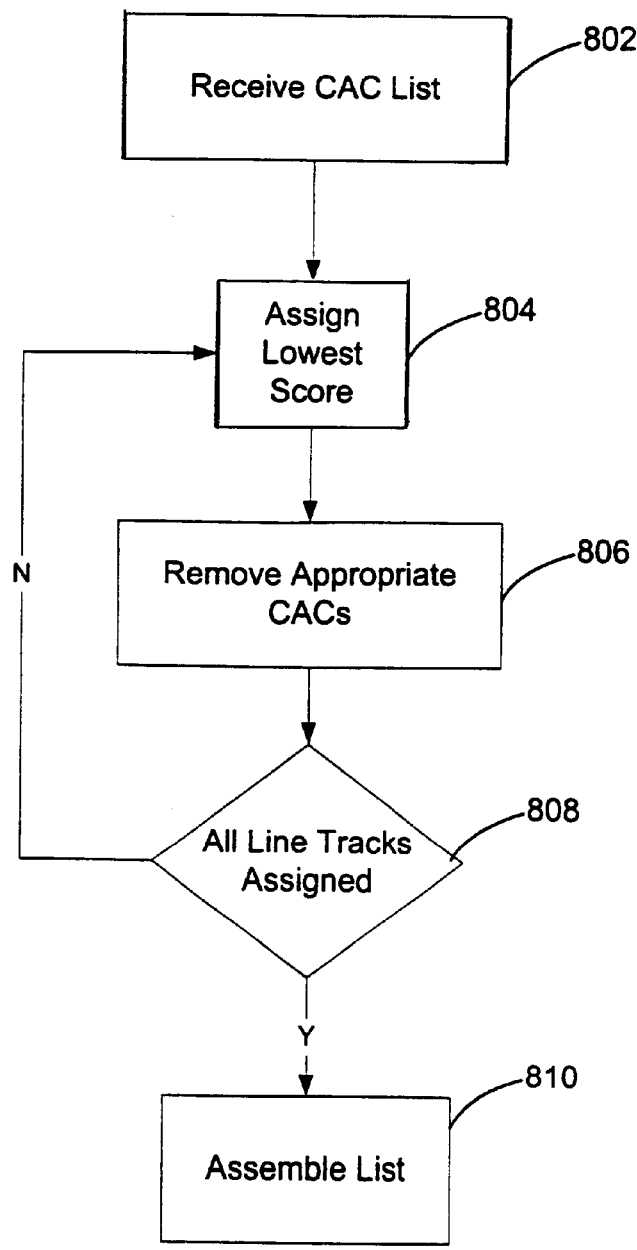
FIG. 8 illustrates a flowchart for assigning line tracks in accordance with an embodiment of the present invention.

FIG. 8 depicts a flowchart for assigning line tracks in accordance with an embodiment of the present invention. As disclosed above, after scoring, the process for assigning the scored line tracks according to a specific order. Step 802 executes by receiving the scored CAC list. The CACs and line tracks should have passed all gates and criteria to be assigned. Step 804 executes by assigning the CAC with the lowest score to a target track. Step 806 executes by removing the appropriate CACs from consideration that are related to the assigned CAC from step 804. Step 808 executes by determining if all line tracks have been assigned. If no, then the process returns to step 804 to assign the next lowest scoring CAC. If yes, then step 810 executes by assembling the list of the assigned line tracks for track filtering operations.

Figure 9:
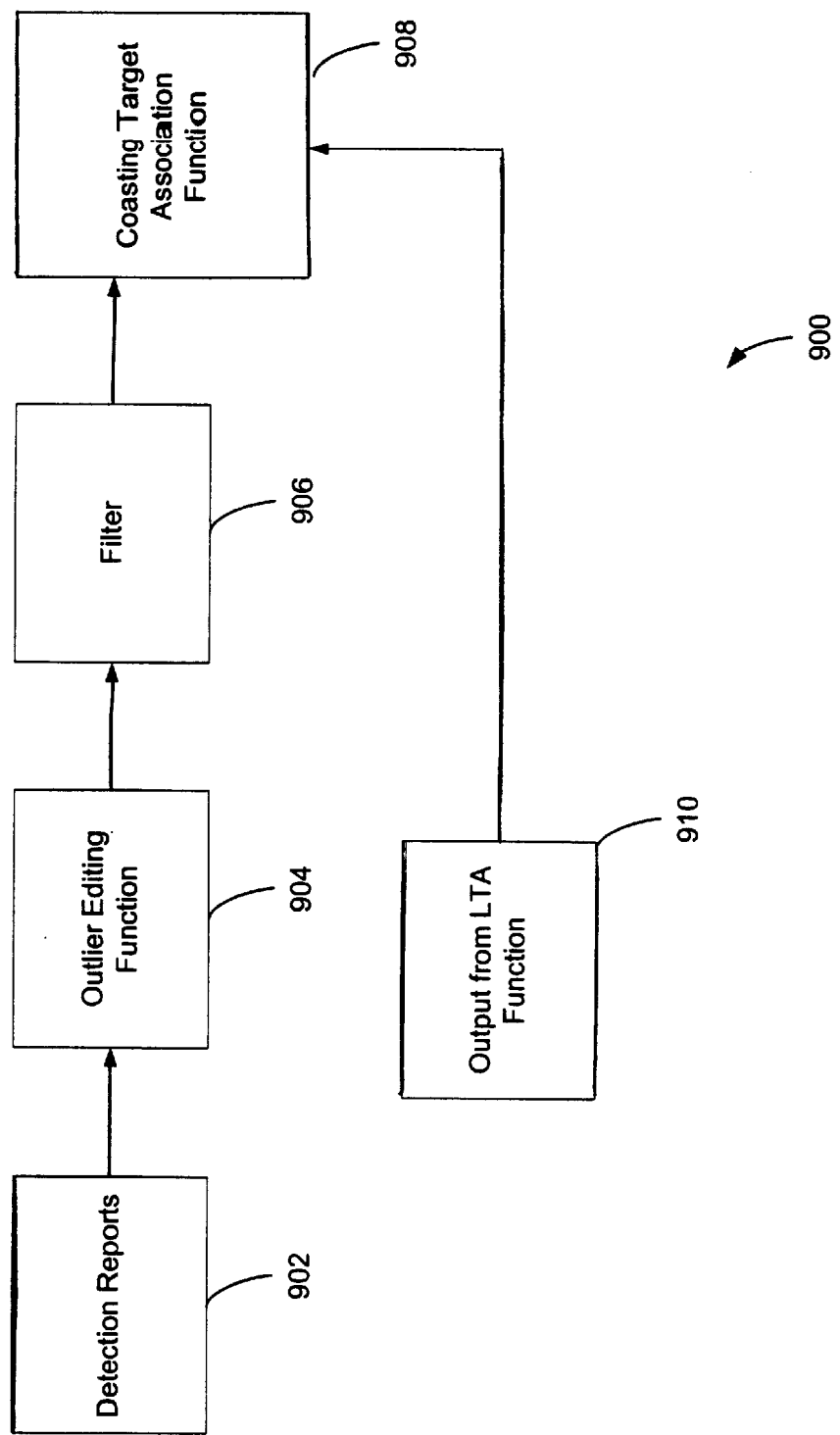
FIG. 9 illustrates a block diagram for assigning line tracks in accordance with an embodiment of the present invention.

FIG. 9 depicts a track filtering function in accordance with an embodiment of the present invention. FIG. 9 depicts line track association function 900 that correlates to line track association function 330 of FIG. 3. Track filtering function 900 discloses a preferred embodiment of track filtering function 330. Track filtering function 330, however, is not limited by the embodiments disclosed by FIG. 9. Track filtering function 900 may utilize an extended Kalman filter to track the position, velocity, and acceleration of each target in two-dimensions and, if all conditions are met, in three-dimensions. The filter's initial state and covariance are initialized in the line track association process disclosed above. Filter tracking may propagate each track incorporating measurements, and monitor the line track association to ensure it remains valid.

Detection reports 902 are received at track filtering function 900. Detection reports 902 may correlate to detection reports 307. Outlier editing function 904 tests the measurement data from detection reports 902 to ensure they are statistically consistent with the track, and to ignore those detection reports that fail the test. Outlier editing function 904 may be utilized by computing the normalized innovations, or a priori measurement residuals, and comparing the result to a chi-square distribution threshold. If the threshold is exceeded, the detection report data may be discarded.

Kalman filter 906 may compute corrections to the state and state covariance from a sequential stream of detection reports 902. Starting with the extrapolated target state and state covariance, the algorithm within Kalman filter 906 computes states updates using measurement information from the current coherent processing interval. The filtering process may desire a prediction step and an update step. The prediction step may desire the computation of measurement residuals and partial derivatives. The filtering operations are disclosed in greater detail below.

The target tracking processing system 300 may permit targets to coast for a time period after the last line track associated with the target has been terminated. As a result, associated targets, or targets currently associated with a line track, are passed to the line track association function 320, or 400. Target coasting allows association of new line tracks that are reasonable extensions of previously terminated line tracks to targets without dropping the target track. For each time update, the output 910 from the line track association function 320 is examined for new targets. The new targets may be compared to the set of coasting, or unassociated, targets and merged with the new target if less that a distance gate. After line track association is performed for the current time update, coasting target association may be implemented. The process implemented is disclosed in greater detail below.

Figure 10:
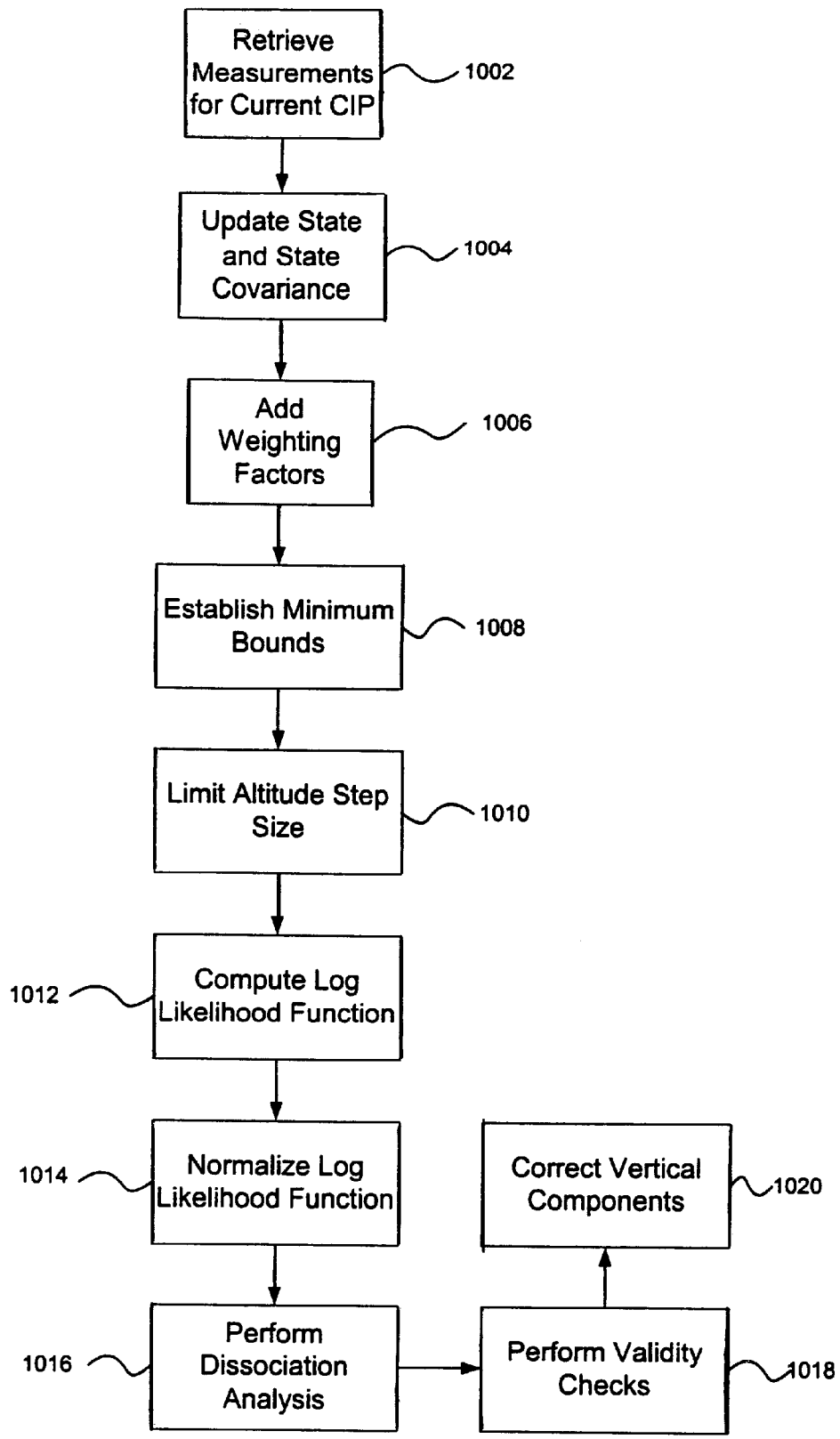
FIG. 10 illustrates a flowchart for filtering detection reports in accordance with an embodiment of the present invention.

FIG. 10 depicts a flowchart for filtering detection reports in accordance with an embodiment of the present invention. Step 1002 executes by retrieving measurements for the current coherent processing interval. For each measurement in the current coherent processing interval, the values may be $$y_k = Y_k - G_k$$

$$H_k = \frac{\partial G_k}{\partial X_T} = \left[ \frac{\partial G_k}{\partial x_T} \quad \frac{\partial G_k}{\partial \dot{x}_T} \quad \frac{\partial G_k}{\partial a_T} \right]$$

where $Y_k$ is the actual measurement, $G_k$ is the computed measurement and $$\frac{\partial G_k}{\partial X_T}$$

are the partial derivative expressions developed above.

Step 1004 executes by updating the state and state covariance. The updating operation to correct the state and state covariance may be $$P = (I - KH)\bar{P}(I - KH)^T + KRK^T$$

$$X = \bar{X} + Ky$$

where $\bar{P}$ may be the extrapolated state covariance matrix, H may be the measurement partial matrix. The Kalman gain may be given by $K = \bar{P}H^T S^{-1}$ and the measurement predicted residual may be given by $S = H\bar{P}H^T + R$, where R is the measurement noise matrix. If the target track may be a single link track, scale the doppler variance value in the measurement noise matrix, R, by the doppler variance scale factor, $$K_{\sigma_{fd}^2},$$

before computing the Kalman gain.

Step 1006 executed by adding independent weight factors. Independent weighting factors may be added for measurements, by type, in the location tracking filter, such as for building the "R" measurement covariance matrix. For example, $$R = \begin{bmatrix} (C_\tau \sigma_\tau)^2 & 0 & 0 & 0 \\ 0 & (C_v \sigma_v)^2 & 0 & 0 \\ 0 & 0 & (C_\theta \sigma_\theta)^2 & 0 \\ 0 & 0 & 0 & (C_\varphi \sigma_\varphi)^2 \end{bmatrix}$$

where $C_\tau$, $C_v$, $C_\theta$, and $C_\varphi$ may be the weighting factors in unitless configuration parameters for delay, doppler, azimuth, and elevation measurement types. Preferably, other functions, such as line tracking, line track association, and the like, use the variances specified within the detection reports.

Whenever a detection report contains $\tau$, $\sigma_\tau^2$, $v$, $\sigma_v^2$, $\theta$, $\sigma_\theta^2$, $\phi$, and $\sigma_{100}^2$, which are the measurements and their variances, within the detector, there may be a scale factor for variances to account for windowing, small biases, and the like. For example, $$\sigma_\tau^2 = \frac{K_\tau^2}{SNR \cdot \beta^2}.$$

Step 1008 executes by establishing minimum bounds for the state error variances. The state error covariance matrix after the measurement update maybe given by $P = [P_{ij}]$ where $I = 1, 2, \ldots, N$; $j = 1, 2, \ldots, N$ and $(\sigma_I)_{min}$ = minimum sigma for state I, which may be a configurable parameter. After a measurement update, P may be enforced to satisfy the minimum values of $\sigma$. If $\sqrt{P_{ii}} < (\sigma_i)_{min}$, then set $$a = \frac{(\sigma_i)_{min}}{\sqrt{P_{ii}}}$$

and set $P_{ij} = a P_{ij}$, $P_{ji} = a P_{ji}$ for $j = 1, 2, \ldots, N$.

Step 1010 executes by limiting the altitude step size between target state updates. The altitude step size may be limited between target state updates by checking the filter state update value corresponding to the target's "Up" component of the ENU coordinate system. If $|U_{t_i} - U_{t_{i-1}}| > Y_{U_{step}}$, then set $U_{ti} = U_{ti-1} + Y_{zstep}$ or $U_{ti} = U_{ti-1} - Y_{Ustep}$ depending on the sign of the difference, where $z_{ti}$ = the Up component of the target's position at the current update time, $z_{ti-1}$ = the Up component of the target's position at the previous update time, and $Y_{Ustep}$ = maximum Up step size for target state updates.

Step 1012 executes by computing the log-likelihood function. The log-likelihood function may be computed at each coherent processing interval according to $\lambda_k = \lambda_{k-1} + y_k^T S^{-1} y_k$. Step 1014 executes by normalizing the log-likelihood function. The normalized log-likelihood function may be computed as $$\bar{\lambda}_k = \frac{\lambda_k - n}{\sqrt{2n}},$$

where n is the total number of observations incorporated into $\lambda_k$.

Step 1016 executes by performing a dissociation analysis. If an FM line track age has reached or exceeded a specified level, a test known to one skilled in the art may be applied using a second specified threshold. If the FM line track fails this test, it may be tagged as a modulation line track, and, if it is part of a location track, the track may be terminated.

For example, if a target track's age is greater than a configurable time, period, $T_{age} > \tau_{llh}$, where $\tau_{llh}$=minimum target age before performing log-likelihood test, then the normalized log-likelihood may be compared to a threshold, or $\bar{\lambda}_k \leq \gamma_{llh}$. If outside the threshold, the line track may be dissociated as disclosed below.

Operations may be implemented when the log-likelihood test fails for a location track composed of multiple FM and television line tracks. The assumptions for the line tracks are that a FM line track is composed of detection reports containing delay, doppler, and an angle-of-arrival measurement, and a television line track is composed of detection reports containing doppler measurements only. Signal power and signal-to-noise ratio estimates also may be included in detection reports. A FM line track without an angle may be treated as a television line track. This action may be different from the dissociation action that may be taken when a FM line track that is assumed to be part of a location track is declared to be a FM modulation line.

The following guidelines describe the dissociation logic. For convenience, "track" may refer to the location track in question, and "test" may refer to the log-likelihood test. If the track is composed of a single FM line track and one or more television line tracks, then, regardless of which line track failed the test, the track may be reinitialized using the FM line track and discarding the television line tracks. If the track is composed of two or more FM line tracks and any number of television line tracks, the line track failing the test may be discarded. The track may be reinitialized if the track was composed of two FM line tracks and no television line tracks. If the track is composed of television line tracks, the track may be terminated.

Step 1018 executes by performing validity checks to ensure the target is valid. This step is disclosed in greater detail below. Step 1020 executes by correcting the vertical components of the updated target's position and velocity. For two-dimensional target tracks, the vertical components may be corrected. Preferably, the vertical components of the updated target's position and velocity are updated, or $x_U$ and $x_U^2$, to account for the earth's curvature.

Figure 11:
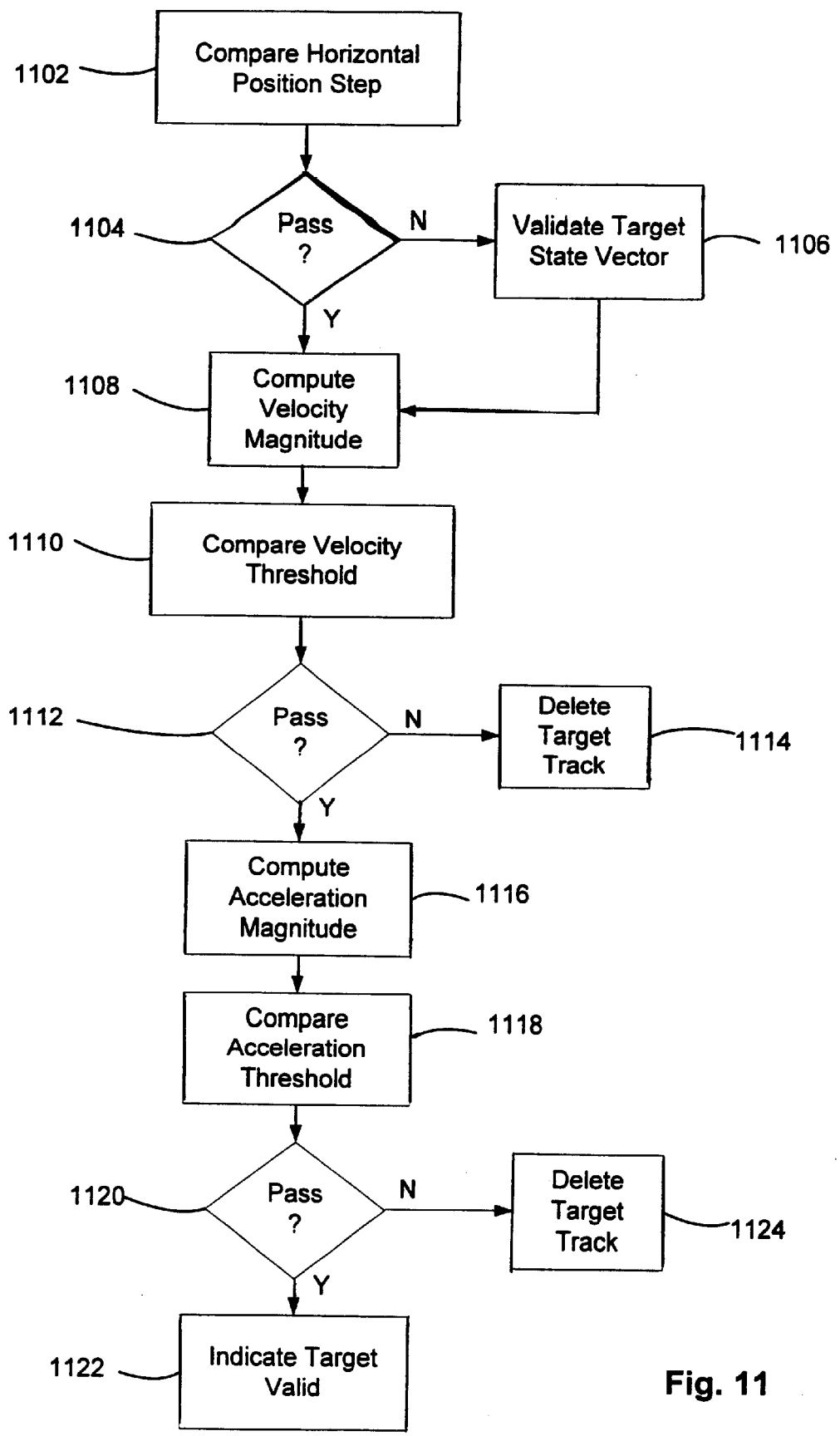
FIG. 11 illustrates a flowchart for performing validity checks for targets in accordance with an embodiment of the present invention.

FIG. 11 depicts a flowchart for performing validity checks for targets in accordance with an embodiment of the present invention. FIG. 11 correlates to step 1018 of FIG. 10. Step 1018, however, is not limited by the embodiments disclosed by FIG. 11. Step 1102 executes by comparing the horizontal position step update. For all targets, the horizontal position step update may be checked against a distance threshold by letting $\hat{X}=Ky$ from above be the computed update to the target state vector for the current coherent position interval. Let $\hat{X}_p^T=[\hat{x} \; \hat{y} \; \hat{z}]$ be the position vector form the target state vector. The horizontal position step may be checked as $$\sqrt{\hat{x}^2+\hat{y}^2} \leq \gamma_{pos}$$

where $\gamma_{pos}$=target position step threshold. Step 1104 executes by determining whether the position check passed. If no, then step 1106 executes by updating the target state vector for position approximately equal to the target position threshold. If yes, then step 1108 is executed.

Step 1108 executes by computing the velocity magnitude of the initial state solution. Preferably, for all targets, the velocity magnitude of the initial state solution may be computed. Step 1110 executes by comparing the velocity magnitude to a velocity threshold as $$\sqrt{\vec{v} \circ \vec{v}} \leq \gamma_{vel},$$

where $\vec{v}$=the two-dimensional or three-dimensional velocity vector of the target state solution, and $\gamma_{vel}$=the target velocity threshold. Step 1112 executes by determining whether the velocity check passed for the target. If no, then step 1114 executes by deleting the target track and passing its associated line track on so it may try to initialize at the next coherent processing interval update. Alternatively, the target track may be reinitialized using the currently associated line tracks. A configuration switch, $M_{vel\_acc}$, may dictate which operation is executed if the check fails.

If step 1112 is yes, then step 1116 executes by computing the acceleration magnitude of the initial state solution. Preferably, for all targets, the acceleration magnitude of the initial state solution may be computed. Step 1118 executes by comparing the acceleration magnitude to an acceleration threshold as $$\vec{a} \circ \vec{a} \leq \gamma_{acc},$$

where $\vec{a}$=the two-dimensional or three-dimensional acceleration vector of the target state solution, and $\gamma_{acc}$=the target acceleration threshold. Step 1120 executes by determining whether the acceleration check passed for the target. If no, then step 1124 executes by deleting the target track and passing its associated line track on so it may try to initialize at the next coherent processing interval update. Alternatively, the target track may be reinitialized using the currently associated line tracks. A configuration switch, $M_{vel\_acc}$, may dictate which operation is executed if the check fails. If step 1120 is yes, then step 1122 executes by indicating that target is valid, and may be passed for target extrapolation or further processing.

Figure 12:
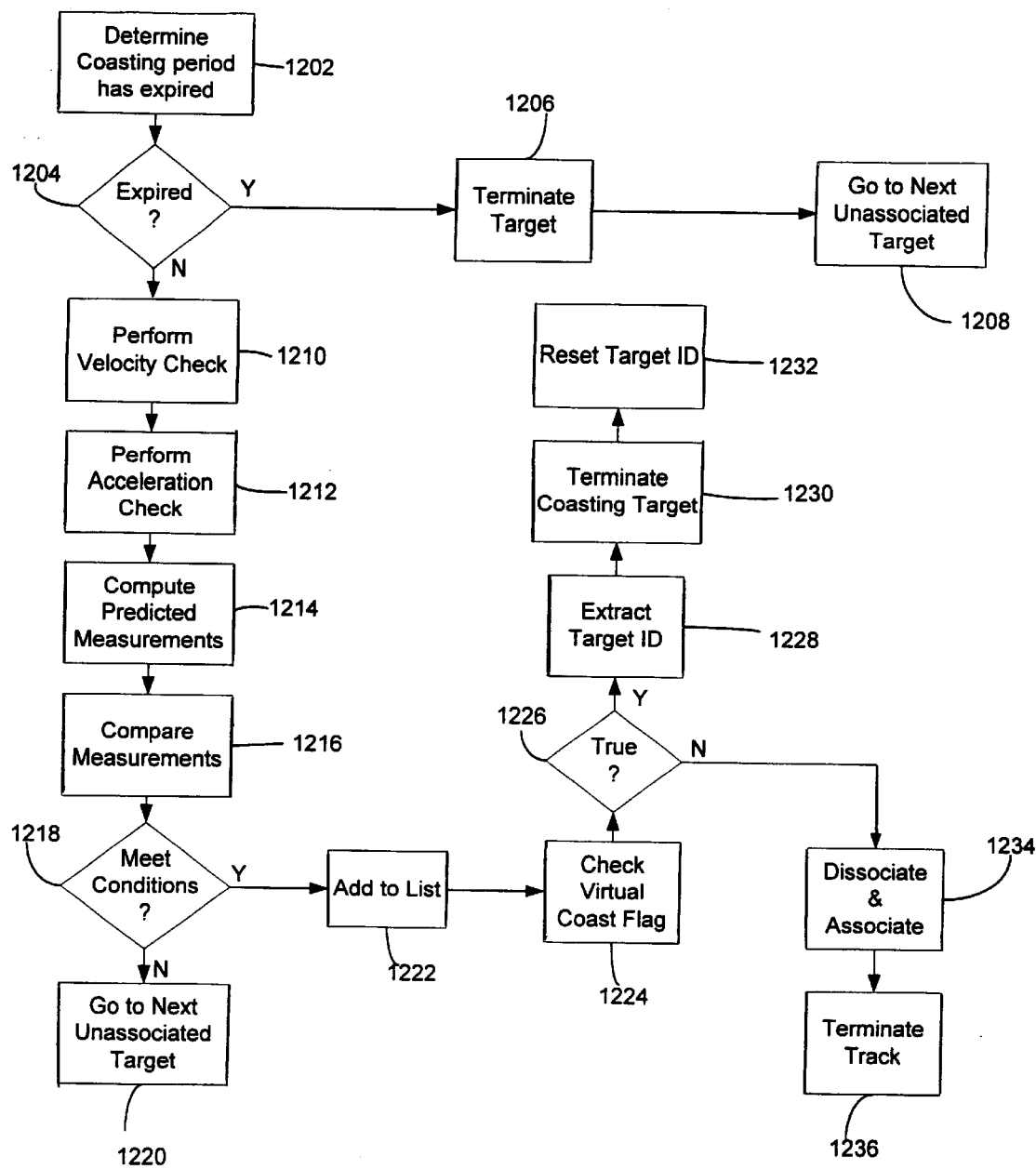
FIG. 12 illustrates a flowchart for associating a coasting target in accordance with an embodiment of the present invention.

FIG. 12 depicts a flowchart for associating a coasting target in accordance with an embodiment of the present invention. Target tracking processing system, such as system 300, incorporating a coasting target association function, such coasting target association function 908, may permit targets to coast for a configurable time period after the last line track associated with the target is terminated. As a result, associated targets, or targets currently associated with a line track, may be passed to the line track association function, such as line track association function 320. Coasting targets allow association of new line tracks that are reasonable extensions of previously terminated line tracks to targets without dropping the target track. For each time update, the line track association function output may be examined for new targets. The new targets may be compared to the set of coasting, or unassociated, targets and merged with the new target if less than a distance gate. After line track association is performed for the current time update, the coasting target may be implemented. Although disclosed as an element of the track filtering function 900 of FIG. 9, the coasting target association function may be implemented outside the track filtering function, and configured anyplace within target tracking processing system 300. The coasting target operations disclosed below may be for each unassociated target in the current coherent processing interval.

Step 1202 executes by checking to see if the allowable coasting period has expired, or $(t_{current} - t_{coast}) > \tau_{coast}$. Step 1204 executes by determining whether the coasting period has expired. If yes, then step 1206 executes by terminating the target. Step 1208 executes by going to the next unassociated target in the current coherent processing interval.

If step 1204 is no, then step 1210 executes by performing a velocity check. Preferably, for all targets, the velocity magnitude of the initial state solution may be computed and compared to a velocity threshold as $\sqrt{\vec{v} \circ \vec{v}} \leq \gamma_{vel}$, where $\vec{v}$=the two-dimensional or three dimensional velocity vector of the target state solution, and $\gamma_{vel}$=the target velocity threshold. If the velocity check fails, then either delete the target track and pass its associated line track on so it may try to initialize at the next coherent processing interval update, or reinitialize the target using the currently associated line tracks. A configuration switch, $M_{vel\_acc}$, may dictate which method is carried out if the check fails.

If the velocity check is valid, then step 1212 executes by performing an acceleration check. Preferably, for all targets, the acceleration magnitude of the initial state solution may compute and compared to acceleration threshold as $\sqrt{\vec{a} \circ \vec{a}} \leq \gamma_{acc}$, where $\vec{a}$ =the two-dimensional or three-dimensional acceleration vector of the target state solution, and $\gamma_{acc}$=target acceleration threshold. If the acceleration check fails, then either delete the target track and pass its associated line track on so it may try to initialize at the next coherent processing interval update, or reinitialize the target using the currently associated line tracks. The configuration switch, $M_{vel\_acc}$, may dictate which method is carried out if the check fails.

Step 1214 executes by computing the predicted measurements of time delay, doppler, and angle-of-arrival based on the current target state prediction for the unassociated target. The set of new targets reported by the line track association function may be looped over for the current coherent processing interval. Step 1216 executes by comparing the new target and the unassociated, or coasting, target measurements of delay, doppler, and angle-of-arrival by $$(t_{d_{coast}} - t_{d_{new}})^2 < \left(\frac{100}{SNR_{new}}\right)(\gamma_{t_{coast}})^2 \;\&\&$$

$$(f_{d_{coast}} - f_{d_{new}})^2 < \left(\frac{100}{SNR_{new}}\right)(\gamma_{f_{coast}})^2 \;\&\&$$

$$(\theta_{coast} - \theta_{new})^2 < \left(\frac{100}{SNR_{new}}\right)(\gamma_{\theta_{coast}})^2$$

where $t_{d_{new}}$, $f_{d_{new}}$, $\theta_{new}$ are the latest detected measurements for the new target, and $\gamma_{t_{coast}}$, $\gamma_{f_{coast}}$, $\gamma_{\theta_{coast}}$ are the coasting target measurement gates. In addition, a comparison on the target bearings may be made, or $$(Bearing_{coast} - Bearing_{new})^2 < (\gamma_{B_{coast}})^2$$

where $\gamma_{B_{coast}}$=a coast target bearing gate. Step 1218 executes by determining whether the compared new target and the unassociated target meet the above disclosed conditions. If no, then step 1220 executes by going to the next unassociated target. If yes, then step 1222 executes by adding those pairs of new targets and unassociated targets to a list of possible coasting target associations.

Step 1224 executes by checking the virtual coast flag. Subsequent operations may depend on the state of a virtual coast flag. A virtual coast may attempt to maintain target identification continuity when new targets have been associated with coasting targets. Step 1226 executes by determining whether the virtual coast flag is true. If yes, then step 1228 executes by extracting the target identification from the coasting target. Step 1230 executes by terminating the coasting target. Step 1232 executes by resetting the target identification of the new target to that of the coasting target while maintaining continuity with all data previously associated with the coasting target, such as file outputs, burned-in tracks on screen, and the like. If step 1226 is no, then step 1234 executes by dissociating the new target's line tracks and associating them with the unassociated target. Step 1236 executes by terminating the new target track.

Thus, in accordance with the disclosed embodiments, a system and method for central association and tracking for PCL applications is disclosed. The disclosed embodiments receive detection reports and other information as inputs and associates the detection reports with existing line tracks, creates new line tracks or terminates line tracks according to the data within the detection reports. The detection reports contain data for signals reflected from potential targets that are being tracked by the PCL system. The disclosed methods, processes and algorithms improve target track estimation techniques. Position, velocity, and acceleration may be estimated for targets detected by the PCL system. Target track processing may be improved by the disclosed embodiments. Therefore, targets may be identified and tracked in a more efficient manner.

In accordance with the disclosed embodiments, detection reports may be received at a target tracking processing system. The detection reports include measurements correlating to line tracks associated with target echoes in earlier processing operations. In addition, other information, such as parameters and observables, may be received by the target track processing system. The target tracking processing system may perform a line track association function and a track filtering function on the line tracks according to the measurements within the detection reports. The line track association function scores CACs of the line tracks and assigns the line tracks according to the scores to target tracks. The line track association function also may initialize new target tracks according to the line tracks. The track filtering function may test and propagated the target tracks according to the received measurements within the detection reports. These operations also help in predicting and estimating target parameters for tracking. Target parameters may be extrapolated from the propagated and updated target tracks, and fed to a display for a user, or back into the PCL system for further processing.

It will be apparent to those skilled in the art that various modifications and variations can be made in the disclosed embodiments of the present invention without departing from the spirit or scope of the invention. Thus, it is intended that the present invention embodies the modifications and variations of this invention provided that they come within the scope of the appended claims and their equivalents.

What is claimed is:

1. A method for associating a line track with a target for a passive coherent location system, wherein said passive coherent location system uses comparison data from a direct and a reflected signal emitted from one or more transmitters geographically separated from a receiver, comprising:

receiving a detection report at least partly derived from said comparison data, said detection report having said line track corresponding to said target;

computing a target state using measurements of said line track;

computing a state covariance using said measurement of said line track;

scoring said line track according to said target state and said state covariance; and assigning said line track to a target track according to said scoring.

2. The method of claim 1, further comprising filtering said target track by computing corrections to said target state and state covariance.

3. The method of claim 2, further comprising updating said target state and state covariance using measurements from said detection report.

4. The method of claim 2, further comprising performing validity checks on said target track.

5. The method of claim 1, further comprising extrapolating target data from said target track and said detection report.

6. The method of claim 5, further comprising extrapolating an updated state vector and a propagated state vector from said target track and said detection report.

7. The method of claim 1, further comprising performing a modulation line test on said line track.

8. The method of claim 1, further comprising placing said detection report in a buffer.

9. The method of claim 1, further comprising initializing said target track.

10. A method for associating and tracking target data within a passive coherent location system, said target data including measurements from a direct and a reflected signal emitted from one or more transmitters geographically separated from a receiver, comprising:

computing a target state and a state covariance from said measurements, said measurements at least partly comprising said comparison data from said direct and reflected signals;

assigning a line track correlating said target data to a target track according to said target state and said state covariance;

initializing said target track;

initializing a filter according to said target state and said state covariance;

tracking said target track with said filter; and extrapolating said target data from said target track.

11. The method of claim 10, further comprising applying at least one gate to said line track.

12. The method of claim 10, further comprising scoring said line track according to said measurements.

13. The method of claim 12, further comprising using a nonlinear least squares batch estimator for said scoring.

14. The method of claim 12, further comprising calculating residuals and partial derivatives for said measurements.

15. The method of claim 12, wherein said assigning occurs according to said scoring.

16. The method of claim 10, further comprising computing corrections to said target state and state covariance.

17. The method of claim 16, further comprising updating said target state and said state covariance with said corrections.

18. The method of claim 10, further comprising receiving a detection report including said measurements and said line track.

19. The method of claim 10, further comprising receiving parameters for a receiver and an illuminator to be used in initializing said target track.

20. The method of claim 10, further comprising outputting said target data to a display.

21. A method for associating a line track to a target track for target tracking operations within a passive coherent location system, wherein said passive coherent location system uses comparison data from a direct and a reflected signal emitted from one or more transmitters geographically separated from a receiver, comprising:

determining a candidate association combination for said line track;

applying at least one gate to said candidate association combination;

estimating a target state for said line track;

estimating a state covariance for said line track;

computing a score for said candidate association combination according to said target state and said state covariance; and assigning said line track to a target track according to said score.

22. The method of claim 21, further comprising initializing said target track.

23. The method of claim 21, wherein said estimating includes using a nonlinear least squares estimator.

24. The method of claim 23, further comprising seeding said nonlinear least squares estimator.

25. The method of claim 21, further comprising performing a modulation line test on said line track.

26. The method of claim 21, further comprising buffering said line track.

27. The method of claim 21, further comprising indicating said line track is available for line track association.

28. The method of claim 21, further comprising removing said line track from a list of unassigned line tracks after said assigning.

29. The method of claim 21, further comprising identifying multiple illuminators for said line track.

30. The method of claim 29, further comprising performing an illuminator hypothesis for said line track according to parameters from said multiple illuminators.

31. The method of claim 21, further comprising applying post-scoring gates to said score.

32. A method for filtering a target track correlating with a detection report having measurements associated with a target within a passive coherent location system, wherein said passive coherent location system uses comparison data from a direct and a reflected signal emitted from one or more transmitters geographically separated from a receiver, comprising:

computing corrections for a target state and state covariance for said detection report, said detection report at least partly derived from said comparison data;

updating said target state and said state covariance with said corrections; and propagating said target track with said updated target state and said updated state covariance.

33. The method for claim 32, further comprising editing said target track.

34. The method of claim 32, further comprising adding weighting factors to said measurements.

35. The method of claim 32, further comprising performing at least one validity check on said updated target track.

36. The method of claim 35, further comprising removing said target track when said target track fails said at least one validity check.

37. A system for estimating target parameters for a target in a passive coherent location system, wherein said passive coherent location system uses comparison data from a direct and a reflected signal emitted from one or more transmitters geographically separated from a receiver, comprising:

detection reports comprising measurements at least partly derived from said comparison data;

a line track association function to associate a line track correlating to said detection reports to a target track;

a track filtering function to propagate said target track according to said measurements; and a target extrapolation function to calculate said target parameters from said target track and said measurements.

38. The system of claim 37, wherein said line track association function generates a state vector and a covariance matrix for said line track.

39. The system of claim 38, wherein said track filtering function propagates said state vector and said covariance matrix.

40. The system of claim 39, wherein said target data extrapolation function extrapolates said target parameters from said propagated state vector and said propagated covariance matrix.

41. The system of claim 37, wherein said line track association function scores said line track.

42. The system of claim 41, wherein said line track association function assigns said line track to said target track according to said score.

43. The system of claim 41, further comprising a nonlinear least squares batch estimator to generate said score.

44. The system of claim 37, further comprising an output including said target parameters.

45. The system of claim 44, wherein said output is transmitted to a display.

46. The system of claim 37, wherein said track filtering function includes a Kalman filter.

47. A system for associating a line track to a target track in a passive coherent location system, wherein said passive coherent location system uses comparison data from a direct and a reflected signal emitted from one or more transmitters geographically separated from a receiver and wherein said line track correlates to at least one detection report, comprising:
 a nonlinear least squares batch estimator to compute a target state and state covariance for measurements from said at least one detection report at least partly derived from said comparison data and to score a candidate associate combination for said line track; and
 a line track assignment function to assign said line track according to said score for said candidate associate combination.

48. The system of claim 47, wherein said target track is initialized.

49. The system of claim 47, further comprising an initialization check function to validate said target track according to said score.

50. The system of claim 47, further comprising pre-scoring gates applied to said at least one detection report.

51. The system of claim 47, further comprising post-scoring gates applied to said score.

52. The system of claim 47, further comprising a buffer to queue said at least one detection report.

53. The system of claim 52, wherein said buffer is a first in, first out buffer.

54. The system of claim 47, wherein said target state and said state covariance is communicated to a track filtering function.

55. A system for track filtering a target track in a passive coherent location system, wherein said passive coherent location system uses comparison data from a direct and a reflected signal emitted from one or more transmitters geographically separated from a receiver and wherein said target track is associated with a line track from at least one detection report, comprising:
 a filter to compute corrections to a target state and state covariance to update said target track using a means for computing measurement residuals and partial derivatives of measurements from said at least one detection report; and
 a validity checker to check said updated target track using a velocity magnitude component and an acceleration magnitude component.

56. The system of claim 55, further comprising an outlier editor to test said measurements from said at least one detection report, wherein said outlier editing function discards said target track if said test is failed.

57. The system of claim 55, further comprising weighting factors within said filter for said measurements.

58. The system of claim 55, further comprising a dissociation function to resolve a target track composed of multiple line tracks, including said line track.

59. The system of claim 55, further comprising a coasting target association function to coast said target track for a specified period of time.

60. A system for associating a line track for a target for a passive coherent location system, wherein said passive coherent location system uses comparison data from a direct and a reflected signal emitted from one or more transmitters geographically separated from a receiver, comprising:
 means for receiving a detection report, at least partly derived from said comparison data, said detection report having said line track corresponding to said target;
 means for computing a target state and state covariance for measurements of said line track;
 means for scoring said line track according to said target state and said state covariance; and
 means for assigning said line track to a target track according to said scoring.

61. A system for associating and tracking target data within a passive coherent location system, said target data including measurements from a direct and a reflected signal emitted from one or more transmitters geographically separated from a receiver, comprising:
 means for computing a target state and state covariance from said measurements, said measurements at least partly comprising comparison data from said direct and reflected signals;
 means for assigning a line track correlating to said target data to a target track according to said target state and said state covariance; means for initializing said target track;
 means for initializing a filter according to said target state and said state covariance;
 means for tracking said target track with said filter; and
 means for extrapolating said target data from said target track.

62. A system for associating a line track to a target track for target tracking operations within a passive coherent location system, wherein said passive coherent location system uses comparison data from a direct and a reflected signal emitted from one or more transmitters geographically separated from a receiver, comprising:
 means for determining a candidate association combination for said line track;
 means for applying at least one gate to said candidate association combination;
 means for estimating a target state and a state covariance for said line track;
 means for computing a score for said candidate association combination according to said target state and said state covariance; and
 means for assigning said line track to a target track according to said score.

63. A system for filtering a target track correlating with a detection report having measurements associated with a target within a passive coherent location system, wherein said passive coherent location system uses comparison data from a direct and a reflected signal emitted from one or more transmitters geographically separated from a receiver, comprising:

means for computing corrections for a target state and state covariance for said detection report, said detection report at least partly derived from said comparison data;

means for updating said target state and said state covariance with said corrections; and means for propagating said target track with said updated target state and said updated state covariance.

64. A computer program product comprising a computer useable medium having computer readable code embodied therein for associating a line track for a target for a passive coherent location system, wherein said passive coherent location system uses at least one of time-difference-of-arrival (TDOA) and frequency-difference-of-arrival (FDOA) data from a direct and a reflected signal emitted from one or more transmitters geographically separated from a receiver, and the computer program product adapted when run on a computer to execute steps, including:

receiving a detection report at least partly derived from said data, said detection report having said line track corresponding to said target;

computing a target state and state covariance for measurements of said line track;

scoring said line track according to said target state and said state covariance; and assigning said line track to a target track according to said scoring.

65. A computer program product comprising a computer useable medium having computer readable code embodied therein for associating and tracking target data within a passive coherent location system, said target data including measurements from a direct and a reflected signal emitted from one or more transmitters geographically separated from a receiver said target data including measurements, the computer program product adapted when run on a computer to execute steps, including:

computing a target state and state covariance from said measurements said measurements at least partly comprising at least one of TDOA and FDOA data;

assigning a line track correlating to said target data to a target track according to said target state and said state covariance;

initializing said target track; initializing a filter according to said target state and said state covariance;

tracking said target track with said filter; and extrapolating said target data from said target track.

66. A computer program product comprising a computer useable medium having computer readable code embodied therein for associating a line track to a target track for target tracking operations within a passive coherent location system, wherein said passive coherent location system uses at least one of TDOA and FDOA data from a direct and a reflected signal emitted from one or more transmitters geographically separated from a receiver, the computer program product adapted when run on a computer to execute steps, including:

determining a candidate association combination for said line track;

applying at least one gate to said candidate association combination;

estimating a target state and a state covariance for said line track;

computing a score for said candidate association combination according to said target state and said state covariance; and assigning said line track to a target track according to said score.

67. A computer program product comprising a computer useable medium having computer readable code embodied therein for filtering a target track correlating with a detection report having measurements associated with a target within a passive coherent location system, wherein said passive coherent location system uses at least one of TDOA and FDOA data from a direct and a reflected signal emitted from one or more transmitters geographically separated from a receiver, the computer program product adapted when run on a computer to execute steps, including:

computing corrections for a target state and state covariance for said detection report, said detection report being at least partly derived from said data;

updating said target state and said state covariance with said corrections; and propagating said target track with said updated target state and said updated state covariance.

* * * * *